(12) United States Patent
Kitamura

(10) Patent No.: US 7,542,612 B2
(45) Date of Patent: Jun. 2, 2009

(54) SIGNAL PROCESSING METHOD AND SIGNAL PROCESSING DEVICE

(75) Inventor: Shinji Kitamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 920 days.

(21) Appl. No.: 10/957,982

(22) Filed: Oct. 5, 2004

(65) Prior Publication Data

US 2005/0100228 A1 May 12, 2005

(30) Foreign Application Priority Data

Nov. 6, 2003 (JP) ............................. 2003-376962

(51) Int. Cl.
*G06K 9/36* (2006.01)
*G06K 9/46* (2006.01)

(52) U.S. Cl. ...................... 382/232; 382/250
(58) Field of Classification Search ................. 382/232, 382/233, 234, 246, 250; 386/33, 109
See application file for complete search history.

(56) References Cited

U.S. PATENT DOCUMENTS

| | | | |
|---|---|---|---|
| 5,450,209 A | | 9/1995 | Niimura et al. |
| 5,838,834 A | * | 11/1998 | Saito ........................... 382/251 |
| 6,313,767 B1 | * | 11/2001 | Ishizuka et al. ............... 341/67 |
| 2002/0122599 A1 | | 9/2002 | Igarashi et al. |

FOREIGN PATENT DOCUMENTS

JP     11-252338 A     9/1999

* cited by examiner

*Primary Examiner*—Phuoc Tran
(74) *Attorney, Agent, or Firm*—McDermott Will & Emery LLP

(57) ABSTRACT

A storage unit which stores n pieces of data is formed by m memories (m≠n). The n pieces of data are sorted into the memories such that the n pieces of data can be read in parallel no matter which read scan mode is selected among a plurality of read scan modes. With this structure, rearrangement of image data, or the like, is realized with low cost and high speed.

18 Claims, 28 Drawing Sheets

FIG. 3A
FIRST SCAN (RASTER)

FIG. 3B
SECOND SCAN (ZIGZAG)

FIG. 3C
THIRD SCAN (ALTERNATE HORIZONTAL)

FIG. 3D
FOURTH SCAN (ALTERNATE VERTICAL)

FIRST MEMORY
SECOND MEMORY
THIRD MEMORY

FIG. 4A
FIRST MEMORY

| A1 | WD1 |
|----|-----|
| 0  | 0   |
| 1  | 3   |
| 2  | 6   |
| 3  | 9   |
| 4  | 12  |
| 5  | 15  |
| 6  | 18  |
| 7  | 21  |
| 8  | 24  |
| 9  | 27  |
| 10 | 30  |
| 11 | 33  |
| 12 | 36  |
| 13 | 39  |
| 14 | 42  |
| 15 | 45  |
| 16 | 48  |
| 17 | 51  |
| 18 | 54  |
| 19 | 57  |
| 20 | 60  |
| 21 | 63  |

FIG. 4B
SECOND MEMORY

| A2 | WD2 |
|----|-----|
| 0  | 1   |
| 1  | 4   |
| 2  | 7   |
| 3  | 10  |
| 4  | 13  |
| 5  | 16  |
| 6  | 19  |
| 7  | 22  |
| 8  | 25  |
| 9  | 28  |
| 10 | 31  |
| 11 | 34  |
| 12 | 37  |
| 13 | 40  |
| 14 | 43  |
| 15 | 46  |
| 16 | 49  |
| 17 | 52  |
| 18 | 55  |
| 19 | 58  |
| 20 | 61  |

FIG. 4C
THIRD MEMORY

| A3 | WD3 |
|----|-----|
| 0  | 2   |
| 1  | 5   |
| 2  | 8   |
| 3  | 11  |
| 4  | 14  |
| 5  | 17  |
| 6  | 20  |
| 7  | 23  |
| 8  | 26  |
| 9  | 29  |
| 10 | 32  |
| 11 | 35  |
| 12 | 38  |
| 13 | 41  |
| 14 | 44  |
| 15 | 47  |
| 16 | 50  |
| 17 | 53  |
| 18 | 56  |
| 19 | 59  |
| 20 | 62  |

FIG. 5

FIRST SCAN (RASTER)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A1 | 0 | 8 |  | 16 | 3 |  | 11 | 19 |  | 6 | 14 |  | 1 | 9 |  | 17 | 4 |  | 12 | 20 |  | 7 | 15 |  | 2 | 10 |  | 18 | 5 |  | 13 | 21 |
| WD1 | 0 | 24 | | 48 | 9 | | 33 | 57 | | 18 | 42 | | 3 | 27 | | 51 | 12 | | 36 | 60 | | 21 | 45 | | 6 | 30 | | 54 | 15 | | 39 | 63 |
| WE1 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A2 |  | 5 | 13 |  | 0 | 8 |  | 16 | 3 |  | 11 | 19 |  | 6 | 14 |  | 1 | 9 |  | 17 | 4 |  | 12 | 20 |  | 7 | 15 |  | 2 | 10 |  | 18 |
| WD2 | 16 | 40 | | 1 | 25 | | 49 | 10 | | 34 | 58 | | 19 | 43 | | 4 | 28 | | 52 | 13 | | 37 | 61 | | 22 | 46 | | 7 | 31 | | 55 |
| WE2 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A3 | 2 |  | 10 | 18 |  | 5 | 13 |  | 0 | 8 |  | 16 | 3 |  | 11 | 19 |  | 6 | 14 |  | 1 | 9 |  | 17 | 4 |  | 12 | 20 |  | 7 | 15 |  |
| WD3 | 8 | 32 | 56 | | 17 | 41 | | 2 | 26 | | 50 | 11 | | 35 | 59 | | 20 | 44 | | 5 | 29 | | 53 | 14 | | 38 | 62 | | 23 | 47 | |
| WE3 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 | 1 | 1 | 0 |

FIG. 6

SECOND SCAN (ZIGZAG)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A1 | 0 | | 3 | 1 | 8 | | 6 | | 4 | 11 | 16 | | 9 | 2 | | 7 | 14 | | 19 | 12 | | 5 | 10 | 17 | | 15 | | 13 | 20 | 18 | | 21 |
| RD1 | 0 | | 9 | 3 | 24 | 18 | | | 12 | 33 | 48 | | 27 | 6 | | 21 | 42 | | 57 | 36 | | 15 | 30 | 51 | | 45 | | 39 | 60 | 54 | | 63 |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A2 | 0 | 5 | | 3 | | 8 | | 1 | 6 | | 13 | 11 | | 4 | 2 | 9 | | 16 | | 14 | 7 | | 12 | | 19 | 17 | 10 | 15 | | 20 | 18 | |
| RD2 | 1 | 16 | | 10 | | 25 | | 4 | 19 | | 40 | 34 | | 13 | 7 | 28 | | 49 | | 43 | 22 | | 37 | | 58 | 52 | 31 | 46 | | 61 | 55 | |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A3 | 2 | 0 | | 5 | 10 | 3 | 1 | | 8 | | 13 | 6 | | 4 | | 11 | 18 | 16 | | 9 | 7 | | | 12 | | 14 | 19 | | 17 | | 15 | 20 |
| RD3 | 8 | 2 | | 17 | 32 | 11 | 5 | | 26 | | 41 | 20 | | 14 | | 35 | 56 | 50 | | 29 | 23 | | | 38 | | 44 | 59 | | 53 | | 47 | 62 |

FIG. 7

THIRD SCAN (ALTERNATE HORIZONTAL)

FIG. 8

FOURTH SCAN (ALTERNATE VERTICAL)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A1 | 0 | 8 | 3 | | | | | 16 | 19 | 11 | 6 | 1 | 4 | 9 | 14 | | 17 | | | 2 | 7 | 12 | 20 | 15 | | 10 | 5 | | | 18 | 13 | 21 |
| RD1 | 0 | 24 | 9 | | | | 48 | 57 | 33 | 18 | 3 | 12 | 27 | 42 | | 51 | | | 6 | 21 | 36 | 60 | 45 | | 30 | 15 | | | 54 | 39 | 63 | |
| A2 | 5 | 0 | 3 | 8 | 13 | | 16 | | 1 | 6 | 11 | 19 | 14 | | | | 9 | 4 | | | | 17 | 12 | 20 | 7 | 2 | 10 | 15 | | | 18 | |
| RD2 | 16 | 1 | 10 | 25 | 40 | | 49 | | 4 | 19 | 34 | 58 | 43 | | | 28 | 13 | | | | 52 | 37 | 61 | 22 | 7 | 31 | 46 | | | 55 | | |
| A3 | 2 | | 0 | 5 | 10 | 18 | | 13 | 8 | 3 | | | | 16 | 11 | 19 | 6 | 1 | 4 | 9 | 14 | | | 17 | | | | 7 | 12 | 20 | 15 | |
| RD3 | 8 | | 2 | 17 | 32 | 56 | | 41 | 26 | 11 | | | | 50 | 35 | 59 | 20 | 5 | 14 | 29 | 44 | | | 53 | | | | 23 | 38 | 62 | 47 | |

FIG. 14A

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 14B

| AA | WDAL | WDAU |
|---|---|---|
| 0 | 0 | 8 |
| 1 | 1 | 9 |
| 2 | 2 | 10 |
| 3 | 3 | 11 |
| 4 | 4 | 12 |
| 5 | 5 | 13 |
| 6 | 6 | 14 |
| 7 | 7 | 15 |
| 8 | 16 | 24 |
| 9 | 17 | 25 |
| 10 | 18 | 26 |
| 11 | 19 | 27 |
| 12 | 20 | 28 |
| 13 | 21 | 29 |
| 14 | 22 | 30 |
| 15 | 23 | 31 |
| 16 | 32 | 40 |
| 17 | 33 | 41 |
| 18 | 34 | 42 |
| 19 | 35 | 43 |
| 20 | 36 | 44 |
| 21 | 37 | 45 |
| 22 | 38 | 46 |
| 23 | 39 | 47 |
| 24 | 48 | 56 |
| 25 | 49 | 57 |
| 26 | 50 | 58 |
| 27 | 51 | 59 |
| 28 | 52 | 60 |
| 29 | 53 | 61 |
| 30 | 54 | 62 |
| 31 | 55 | 63 |

FIG. 15

FIRST SCAN (RASTER)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| AA | 0 | 8 | 16 | 24 | 1 | 9 | 17 | 25 | 2 | 10 | 18 | 26 | 3 | 11 | 19 | 27 | 4 | 12 | 20 | 28 | 5 | 13 | 21 | 29 | 6 | 14 | 22 | 30 | 7 | 15 | 23 | 31 |
| WDAU | 0 | 16 | 32 | 48 | 1 | 17 | 33 | 49 | 2 | 18 | 34 | 50 | 3 | 19 | 35 | 51 | 4 | 20 | 36 | 52 | 5 | 21 | 37 | 53 | 6 | 22 | 38 | 54 | 7 | 23 | 39 | 55 |
| WDAL | 8 | 24 | 40 | 56 | 9 | 25 | 41 | 57 | 10 | 26 | 42 | 58 | 11 | 27 | 43 | 59 | 12 | 28 | 44 | 60 | 13 | 29 | 45 | 61 | 14 | 30 | 46 | 62 | 15 | 31 | 47 | 63 |

FIG. 16

SECOND SCAN (ZIGZAG)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| AA | 0 | 0 | 1 | 3 | 9 | 16 | 10 | 4 | 4 | 10 | 16 | 17 | 11 | 5 | 7 | 13 | 19 | 25 | 19 | 13 | 7 | 14 | 20 | 26 | 28 | 22 | 23 | 29 | 29 | 23 | 30 |  |
| RDA |  | 0 | 8 | 2 | 17 | 32 | 18 | 4 | 12 | 26 | 40 | 41 | 27 | 13 | 21 | 35 | 49 | 57 | 43 | 29 | 15 | 30 | 44 | 58 | 52 | 38 | 39 | 53 | 61 | 47 | 62 |  |

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| AB | 1 | 8 | 2 | 2 | 8 | 9 | 3 | 5 | 11 | 17 | 24 | 18 | 12 | 6 | 6 | 12 | 18 | 24 | 26 | 20 | 14 | 15 | 21 | 27 | 27 | 21 | 15 | 22 | 28 | 30 | 31 |  |
| RDB |  | 1 | 16 | 2 | 10 | 24 | 25 | 11 | 5 | 19 | 33 | 48 | 34 | 20 | 6 | 22 | 36 | 50 | 56 | 42 | 28 | 14 | 23 | 37 | 51 | 59 | 45 | 31 | 46 | 60 | 54 | 55 | 63 |

FIG. 17

THIRD SCAN (ALTERNATE HORIZONTAL)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| AA | 0 | 2 | 0 | 8 | 2 | 4 | 6 | 15 | 11 | 8 | 16 | 10 | 12 | 14 | 12 | 16 | 24 | 14 | 18 | 20 | 24 | 22 | 20 | 22 | 26 | 24 | 26 | 28 | 26 | 30 | 28 | 30 |
| RDA | 0 | 2 | 8 | 16 | 10 | 4 | 6 | 15 | 13 | 24 | 32 | 26 | 20 | 22 | 28 | 30 | 34 | 40 | 48 | 42 | 36 | 38 | 44 | 46 | 50 | 56 | 58 | 52 | 54 | 60 | 62 |
| AB | 1 | 3 | 1 | 9 | 3 | 5 | 7 | | 4 | 10 | 9 | 17 | 11 | 13 | 15 | 13 | 17 | 25 | 15 | 19 | 21 | 25 | 23 | 21 | 23 | 27 | 25 | 27 | 29 | 27 | 31 | 29 | 31 |
| RDB | 1 | 3 | 9 | 17 | 11 | 5 | 7 | 14 | 12 | 18 | 25 | 33 | 27 | 21 | 23 | 29 | 31 | 35 | 41 | 49 | 43 | 37 | 39 | 45 | 47 | 51 | 57 | 59 | 53 | 55 | 61 | 63 |

FIG. 18

FOURTH SCAN (ALTERNATE VERTICAL)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| AA | 0 | 8 | 1 | 2 | 9 | 16 | 24 | 25 | 17 | 10 | 3 | 4 | 11 | 18 | 26 | 19 | 27 | 12 | 5 | 6 | 13 | 20 | 28 | 21 | 29 | 14 | 7 | 15 | 22 | 30 | 23 | 31 |
|  | 0 | 16 | 1 | 2 | 17 | 32 | 48 | 57 | 41 | 26 | 3 | 4 | 19 | 34 | 50 | 35 | 51 | 20 | 5 | 6 | 21 | 36 | 52 | 37 | 53 | 22 | 7 | 23 | 38 | 54 | 39 | 55 |
| RDA | 8 | 24 | 9 | 10 | 25 | 40 | 56 | 49 | 33 | 18 | 11 | 12 | 27 | 42 | 58 | 43 | 59 | 28 | 13 | 14 | 29 | 44 | 60 | 45 | 61 | 30 | 15 | 31 | 46 | 62 | 47 | 63 |

FIG. 24A
PRIOR ART

FIRST SCAN (RASTER)

FIG. 24B
PRIOR ART

SECOND SCAN (ZIGZAG)

▨ FIRST MEMORY
☐ SECOND MEMORY

FIG. 25A
PRIOR ART
FIRST MEMORY

| A1 | WD1 |
|---|---|
| 0 | 0 |
| 1 | 9 |
| 2 | 10 |
| 3 | 11 |
| 4 | 4 |
| 5 | 13 |
| 6 | 14 |
| 7 | 15 |
| 8 | 16 |
| 9 | 17 |
| 10 | 26 |
| 11 | 19 |
| 12 | 20 |
| 13 | 21 |
| 14 | 22 |
| 15 | 31 |
| 16 | 32 |
| 17 | 41 |
| 18 | 42 |
| 19 | 43 |
| 20 | 44 |
| 21 | 37 |
| 22 | 46 |
| 23 | 47 |
| 24 | 48 |
| 25 | 49 |
| 26 | 50 |
| 27 | 59 |
| 28 | 52 |
| 29 | 53 |
| 30 | 54 |
| 31 | 63 |

FIG. 25B
PRIOR ART
SECOND MEMORY

| A2 | WD2 |
|---|---|
| 0 | 8 |
| 1 | 1 |
| 2 | 2 |
| 3 | 3 |
| 4 | 12 |
| 5 | 5 |
| 6 | 6 |
| 7 | 7 |
| 8 | 24 |
| 9 | 25 |
| 10 | 18 |
| 11 | 27 |
| 12 | 28 |
| 13 | 29 |
| 14 | 30 |
| 15 | 23 |
| 16 | 40 |
| 17 | 33 |
| 18 | 34 |
| 19 | 35 |
| 20 | 36 |
| 21 | 45 |
| 22 | 38 |
| 23 | 39 |
| 24 | 56 |
| 25 | 57 |
| 26 | 58 |
| 27 | 51 |
| 28 | 60 |
| 29 | 61 |
| 30 | 62 |
| 31 | 55 |

FIG. 26A
PRIOR ART

FIRST SCAN (RASTER)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A1 | 0 | 8 | 16 | 24 | 1 | 9 | 17 | 25 | 2 | 10 | 18 | 26 | 3 | 11 | 19 | 27 | 4 | 12 | 20 | 28 | 5 | 13 | 21 | 29 | 6 | 14 | 22 | 30 | 7 | 15 | 23 | 31 |
| WD1 | 0 | 16 | 32 | 48 | 9 | 17 | 41 | 49 | 10 | 26 | 42 | 50 | 11 | 19 | 43 | 59 | 4 | 20 | 44 | 52 | 13 | 21 | 37 | 53 | 14 | 22 | 46 | 54 | 15 | 31 | 47 | 63 |

| A2 | 0 | 8 | 16 | 24 | 1 | 9 | 17 | 25 | 2 | 10 | 18 | 26 | 3 | 11 | 19 | 27 | 4 | 12 | 20 | 28 | 5 | 13 | 21 | 29 | 6 | 14 | 22 | 30 | 7 | 15 | 23 | 31 |
| WD2 | 8 | 24 | 40 | 56 | 1 | 25 | 33 | 57 | 2 | 18 | 34 | 58 | 3 | 27 | 35 | 51 | 12 | 28 | 36 | 60 | 5 | 29 | 45 | 61 | 6 | 30 | 38 | 62 | 7 | 23 | 39 | 55 |

FIG. 26B
PRIOR ART

SECOND SCAN (ZIGZAG)

| CLOCK CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A1 | 0 | 2 | 9 | 16 | 3 | 10 | 17 | 24 | 4 | 11 | 18 | 25 | 5 | 12 | 19 | 26 | 6 | 13 | 20 | 27 | 7 | 14 | 21 | 28 | 15 | 22 | 29 | 30 | 23 | 31 | 32 |  |
| RD1 | 0 | 16 | 9 | 10 | 17 | 32 | 11 | 4 | 19 | 26 | 48 | 41 | 20 | 13 | 14 | 21 | 42 | 49 | 50 | 43 | 22 | 15 | 37 | 44 | 59 | 52 | 31 | 46 | 53 | 54 | 47 | 63 |

| A2 | 1 | 8 | 2 | 3 | 24 | 25 | 18 | 5 | 4 | 17 | 33 | 40 | 34 | 27 | 6 | 7 | 28 | 35 | 29 | 36 | 23 | 30 | 51 | 58 | 45 | 38 | 39 | 60 | 61 | 55 | 62 |  |
| RD2 | 1 | 8 | 2 | 3 | 24 | 25 | 18 | 5 | 4 | 17 | 33 | 40 | 34 | 27 | 6 | 7 | 28 | 35 | 29 | 36 | 23 | 30 | 51 | 58 | 45 | 38 | 39 | 60 | 61 | 55 | 62 |  |

X : BLOCK TO BE CODED
A,B,C: ADJACENT BLOCKS

FIG. 28A PRIOR ART
FIRST SCAN (RASTER)

FIG. 28B PRIOR ART
SECOND SCAN (ZIGZAG)

FIG. 28C PRIOR ART
THIRD SCAN (ALTERNATE HORIZONTAL)

FIG. 28D PRIOR ART
FOURTH SCAN (ALTERNATE VERTICAL)

FIRST MEMORY
SECOND MEMORY

SIGNAL PROCESSING METHOD AND SIGNAL PROCESSING DEVICE

CROSS-REFERENCE TO RELATED APPLICATION

This application claims priority under 35 U.S.C. §119(a) on Japanese Patent Application No. 2003-376962 filed on Nov. 6, 2003, the entire contents of the specification, drawings and claims of which are hereby incorporated by reference.

BACKGROUND OF THE INVENTION

The present invention relates to a signal processing method and a device for implementing the signal processing method. Specifically, the present invention relates to a block-based coding method which requires a higher processing speed and a device for implementing the coding method.

The field of image compression includes image coding techniques, such as MPEG, JPEG, etc. These coding techniques are image compression techniques wherein an image is divided into a plurality of blocks and sequentially encoded based on a block-by-block basis. The still image coding techniques, represented by JPEG, employ intraframe predictive coding (hereinafter, "intra coding") wherein the spatial redundancy in this small region (block) is utilized for achieving reduction in the amount of information (compression). The motion picture coding techniques, represented by MPEG, employ, in addition to the intra coding, interframe predictive coding (hereinafter, "inter coding") wherein the amount of information is reduced by using temporal prediction, for the purpose of meeting a demand for compressing a larger amount of information than the still image compression.

Hereinafter, the processes commonly performed in these coding techniques are briefly described with reference to FIG. 22. In the first place, image data divided into blocks is subjected to discrete cosine transformation (hereinafter, "DCT") in an orthogonal transformer. Then, for the purpose of increasing the coding efficiency (compression efficiency) by removing a high frequency component which is difficult for a human eye to visually perceive, DCT coefficients are quantized by a quantizer to obtain quantized DCT coefficients. These quantized DCT coefficients are temporarily stored in a storage unit in the write order called "raster scan". The quantized DCT coefficients temporarily stored in the storage unit are then read in the read order called "zigzag scan" and sequentially Huffman-coded by an encoder. Since the order of generating the quantized DCT coefficients and the order of coding the quantized DCT coefficients are different in the block-based coding process, the storage unit is indispensable for carrying out rearrangement of data (change of the scan mode).

In order to increase the processing speed in the above coding process, the speed of controlling memory write and read processes is increased. Such a technique has been known as disclosed in, for example, Japanese Unexamined Patent Publication No. 11-252338 (FIGS. 9 to 11). The technique disclosed in this publication is specifically described below.

A signal processing device 1001 of FIG. 23 is an example of a typical signal processing device disclosed in the above publication. This device is capable of performing the above-described rearrangement of data with high speed. FIG. 24A shows a write scan (raster scan) in a storage unit. FIG. 24B shows a read scan (zigzag scan) from the storage unit.

The signal processing device 1001 of FIG. 23 includes input terminals 2 and 3, input selectors 4 and 5, a storage unit 7, output selectors 9 and 10, output terminals 11 and 12, and a memory control circuit 8. Through the input terminals 2 and 3, n pieces of data which are consecutive in the write scan (first scan) order are sequentially input (herein, n=2). In this example, the data are quantized DCT coefficients (hereinafter, simply referred to as "coefficients"). The input selectors 4 and 5 sort the coefficients input through the input terminals 2 and 3 into a plurality of memories. The storage unit 7 includes a first memory 701 and a second memory 702 for temporarily storing the coefficients. The output selectors 9 and 10 each select one of the n coefficients read from the storage unit 7 (herein, n=2). The coefficients selected by the output selectors 9 and 10 are output through the output terminals 11 and 12, respectively. The memory control circuit 8 controls writing/reading of data in/from the storage unit 7.

High speed data rearrangement with the signal processing device 1001 having the above-described structure is described below.

<Write Control>

Two coefficients input through the input terminals 2 and 3 are input to the input selectors 4 and 5. The first input selector 4 selects a coefficient to be written in the first memory 701, from among the coefficients input through the input terminals 2 and 3 in parallel, based on selection signal S1 input from the memory control circuit 8. The first input selector 4 outputs the selected coefficient as write data WD 1 which is data to be written in the first memory 701. In the meantime, the second input selector 5 selects a coefficient to be written in the second memory 702, from among the coefficients input through the input terminals 2 and 3 in parallel, based on selection signal S2 input from the memory control circuit 8. The second input selector 5 outputs the selected coefficient as write data WD2 which is data to be written in the second memory 702.

Herein, selection signals S1 and S2 are generated such that the coefficients which are consecutive in the write scan order are alternately sorted into the first memory 701 and the second memory 702 on a one-by-one basis, for the purpose of sequentially reading the coefficients from the first memory 701 and the second memory 702 in parallel in the read scan order on a two-by-two basis.

The first memory 701 sequentially writes write data WD1 supplied from the first input selector 4 in address A1 according to address A1 and write enable signal WE1 which are supplied from the memory control circuit 8. The second memory 702 sequentially writes write data WD2 supplied from the second input selector 5 in address A2 according to address A2 and write enable signal WE2 which are supplied from the memory control circuit 8.

FIGS. 25A and 25B show an example of a memory map where the coefficients are sorted into the first memory 701 and the second memory 702 under the above-described control. FIG. 26A shows a specific example of addressing in a write operation in the first memory 701 and the second memory 702 having such a memory map.

<Read Control>

Next, control of sequentially reading quantized DCT coefficients in the read scan order on a two-by-two basis in parallel is described.

In the first place, the memory control circuit 8 sequentially supplies addresses A1 and A2 shown in FIG. 26B to the first memory 701 and the second memory 702 such that the coefficients sorted into the first memory 701 and the second memory 702 under the above-described write control are read from each memory on a one-by-one basis in parallel. In the meantime, the memory control circuit 8 supplies read enable signals RE1 and RE2 to the first memory 701 and the second memory 702, respectively. As a result, the first memory 701 sequentially outputs the quantized DCT coefficients as RD1 in the order of 0, 16, 9, 10, ..., 47, and 63. On the other hand, the second memory 702 sequentially outputs the quantized DCT coefficients as RD2 in the order of 1, 8, 2, 3, ... and 62.

The two coefficients, i.e., RD1 and RD2, which have been read on a one-by-one basis, are input to the output selectors 9 and 10. The memory control circuit 8 supplies selection signals S4 and S5 to the output selectors 9 and 10, respectively, such that a former one of the two coefficients in the read scan (second scan) order is output to the output terminal 11 while the other (latter) coefficient is output to the output terminal 12.

That is, the quantized DCT coefficients are output to the output terminal 11 in the order of 0, 8, 9, 3, ..., 62 and to the output terminal 12 in the order of 1, 16, 2, 10, ... 63. Under such control, rearrangement of the coefficients is performed with high speed.

As described above, the storage unit is formed by n memories, and data which are consecutive in the write scan (first scan) order are sorted in advance into the n different memories in a data write operation such that n consecutive pieces of data are simultaneously output from the different memories in the read scan order. With such a structure, parallel reading of data is possible, and therefore, high speed coding is achieved.

In the case where the available read scan (second scan) mode is only the zigzag scan as in JPEG coding, change of the scan mode with high speed can be achieved by using the above-described technique. However, the above-described technique is not applicable to the case where a plurality of read scan modes (e.g., alternate horizontal scan, alternate vertical scan, zigzag scan) are available as in MPEG-4 which is an image compression technique used for achieving low bit rate coding of motion pictures.

In recent years, MPEG-4, which achieves low bit rate coding, has been applied to various devices, such as cellular phone systems, etc. It is obviously expected that demands for coding of higher resolution images and coding with higher frame rate increase along with the advances of broadband environments in the future.

MPEG-4 has introduced various new techniques for achieving low bit rate, including predictive coding which is employed for the purpose of improving the coding efficiency in an intraframe predictive coding (intra coding) process.

In MPEG-4, in order to improve the coding efficiency in intra coding, an optimum prediction block is selected from a plurality of blocks adjacent to a block to be coded (target block), and the difference between the selected prediction block and the target block is coded in a sequential manner. This coding process is described with reference to FIG. 27.

In FIG. 27, block X is a block to be coded (target block), and blocks A, B and C are adjacent to block X. Blocks X, A, B and C each include a plurality of DCT coefficients.

Prediction block P of block X is selected as shown in Expression (1):

$$\text{if } (|\sigma A - \sigma B| < |\sigma B - \sigma C|) \quad \text{[Expression (1)]}$$

P=C else

P=A, where σA is a DC coefficient of block A,

σB is a DC coefficient of block B,

σC is a DC coefficient of block C, and

|z| is the absolute value of z.

The gradients of the DC coefficients of adjacent blocks A, B and C are calculated, and a block having the larger gradient is selected as prediction block P of block X.

For example, when block C is selected as prediction block P based on Expression (1), the difference between block X and block C is coded. Alternatively, when block A is selected as prediction block P, the difference between block X and block A is coded (coefficient predictive coding).

Further, MPEG-4 supports two types of prediction methods as the coefficient prediction coding, i.e., DC predictive coding and DC/AC predictive coding.

In the DC prediction coding, only the DC coefficient among the coefficients of the thus-selected prediction block is predicted. The read scan mode for coefficients in a coding process is fixed to zigzag scan (second scan).

The DC/AC predictive coding intends to achieve higher coding efficiency as compared with the DC prediction coding, wherein among the coefficients of a prediction block, not only the DC coefficient but also the AC coefficient is predicted. For example, when block C is selected as prediction block P, all of the coefficients at the upper edge of block C are the subject of prediction. When block A is selected as prediction block P, all of the coefficients at the left edge of block A are the subject of prediction. The read scan mode in the coding process is the alternate horizontal scan (third scan) when block C is selected as prediction block P. When block A is selected as prediction block P, the read scan mode is the alternate vertical scan (fourth scan). That is, the read scan mode in the coding process changes according to selected prediction block P.

The DC prediction coding and the DC/AC predictive coding are adaptively switched. For example, when it is determined that the DC/AC predictive coding achieves higher coding efficiency than the DC prediction coding, the DC/AC predictive coding is employed; but when otherwise, the DC prediction coding is employed. Thus, in MPEG-4, the read scan mode in the coding process needs to support three read scan modes, e.g., alternate horizontal scan, alternate vertical scan, and zigzag scan, rather than only one read scan mode as in JPEG, or the like. In the case where the coding process is performed by using only the DC prediction, the read scan is fixed to the zigzag scan, and therefore, parallel reading of coefficients can be achieved using the technique described in the above-mentioned publication. However, in the case where the coding process is performed by using the DC/AC prediction, the read scan mode is not determined among the three read scan modes till writing of DCT coefficients in that block (determination of AC prediction effect) is completed. Therefore, when n DCT coefficients which are consecutive in the write scan order are sorted into n memories, n consecutive coefficients need to be read in parallel in the selected read scan order no matter which read scan mode is selected.

FIGS. 28A to 28D show specific examples of a coding process that requires a plurality of such read scan modes wherein the technique disclosed in the above-mentioned publication is applied. FIG. 28A shows the first scan (raster scan) which corresponds to FIG. 24A. FIG. 28B shows the second scan (zigzag scan) which corresponds to FIG. 24B. FIG. 28C shows the third scan (alternate horizontal scan). FIG. 28D shows the fourth scan (alternate vertical scan).

As clearly seen from FIGS. 28B to 28D, it is difficult to simultaneously read n consecutive coefficients in the read scan order from n different memories that constitute the storage unit (herein, n=2) for all of the three read scan modes. For example, in the third scan shown in FIG. 28C, coefficients 2 and 3 and coefficients 6 and 7 have to be read from the second memory 702. However, it is impossible to read two coefficients in parallel at one time because these coefficients are stored at different addresses. In this read scan mode, coefficients 16 and 17 and coefficients 10 and 11 have to be read from the first memory 701. However, it is impossible to read two coefficients in parallel at one time because these coefficients are stored at different addresses.

The example described herein is merely an example of memory division wherein the storage unit is formed by two memories in the process of reading two coefficients in parallel. It is difficult to solve the above problems no matter how two coefficients are allocated to two memories.

SUMMARY OF THE INVENTION

In view of the above problems, an objective of the present invention is to provide a less-expensive signal processing method wherein even when a plurality of read scan modes are prepared for reading coefficients in a coding process, and the read scan mode is not yet determined at the time of writing coefficients in a storage unit, n consecutive coefficients can be read constantly from different memories in the read scan order, and quick rearrangement of data is possible. Another objective of the present invention is to provide a signal processing device that implements such a signal processing method.

The first signal processing method of the present invention is a signal processing method for processing two-dimensional block data including a plurality of pieces of data, comprising the steps of: storing the block data by sequentially sorting n pieces of data which are consecutive in the first scan order into m memories, where n is an integer equal to or greater than 2, m is an integer equal to or greater than 3, and m≠n; and performing rearrangement of data by reading a plurality of pieces of data from the m memories and sequentially selecting n consecutive pieces of data in the read scan order selected among the second scan, the third scan and the fourth scan.

With the above method, n pieces of data which are consecutive in the write scan order are rearranged into n pieces of data which are consecutive in the read scan order selected among a plurality of scan orders with high speed, i.e., the scan mode is changed with high speed.

The second signal processing method of the present invention is based on the first signal processing method and further comprises the steps of: performing the first processing on the selected n pieces of data; and after completion of the first processing, sequentially selecting n consecutive pieces of data in the first scan order from the plurality of data read from the m memories and performing the second processing on the selected n pieces of data.

With the above method, rearrangement of data is realized with high speed. As a result, the start of the first processing and the second processing is advanced, and the speed of the processing itself can be increased.

The third signal processing method of the present invention is based on the first signal processing method, wherein: each of the m memories has at least one write port and two or more read ports through which reading of data is possible independently of each other; and the method further includes the steps of performing reading of data through one of the read ports of each of the m memories for rearrangement of the data to perform the first processing on n consecutive pieces of data in the read scan order selected among the second scan, the third scan and the fourth scan, and sequentially selecting n consecutive pieces of data in the first scan order among a plurality of pieces of data read from another read port of each of the m memories in parallel to the first processing to perform the second processing on the selected n pieces of data.

With the above method, rearrangement of a plurality of pieces of data is realized with high speed, and the first processing and the second processing are performed in parallel. Thus, the processing speed can be increased as compared with the second signal processing method.

The fourth signal processing method of the present invention is a signal processing method for processing two-dimensional block data including a plurality of pieces of data, comprising the steps of: storing the block data in a memory having at least one write port and n read ports through which reading of data is possible independently of each other by sequentially writing n consecutive pieces of data in the first scan order from the write port to the memory, where n is an integer equal to or greater than 2; and performing rearrangement of data by reading a plurality of pieces of data through the n read ports of the memory and sequentially selecting n consecutive pieces of data in the read scan order selected among the second scan, the third scan and the fourth scan.

With the above method, rearrangement of data is realized with high speed even when the storage means is formed not by a plurality of memories but by a single memory.

The fifth signal processing method of the present invention is based on the fourth signal processing method and further comprises the steps of: performing the first processing on the selected n pieces of data; and after completion of the first processing, sequentially selecting n consecutive pieces of data in the first scan order from the plurality of data read through the n read ports of the memory and performing the second processing on the selected n pieces of data.

With the above method, rearrangement of data is realized with high speed. As a result, the start of the first processing and the second processing is advanced, and the speed of the processing itself can be increased.

The sixth signal processing method of the present invention is a signal processing method for processing two-dimensional block data including a plurality of pieces of data, comprising the steps of: storing the block data by sequentially sorting n consecutive pieces of data into m memories in the write scan order selected among the second scan, the third scan and the fourth scan, where n is an integer equal to or greater than 2, m is an integer equal to or greater than 3, and m≠n; and performing rearrangement of data by reading a plurality of pieces of data from the m memories and sequentially selecting n consecutive pieces of data in the first scan order.

With the above method, rearrangement of data from the write scan order selected among a plurality of scan orders to the read scan order is performed with high speed.

The seventh signal processing method of the present invention is based on the sixth signal processing method and further comprises the step of decoding the selected n pieces of data.

With this method, a decoding process is realized using a result of high speed data rearrangement.

The eighth signal processing method of the present invention is characterized in that rearrangement of data is performed according to a set operation mode such that: in the first operation mode, rearrangement of data is performed using any of the first to third signal processing methods; and in the second operation mode, rearrangement of data is performed using the sixth or seventh signal processing method.

With the above method, rearrangement of data is performed while the rearrangement mode is appropriately switched according to the operation mode between rearrangement of data from the write scan order to the read scan order selected among a plurality of scan orders and rearrangement of data from the write scan order selected among a plurality of scan orders to the read scan order. As a result, rearrangement of data is realized with low cost and high speed.

The ninth signal processing method of the present invention is based on any of the first, fourth and sixth signal processing methods, wherein: the first scan is a raster scan in a row direction or column direction; the second scan is a zigzag scan; the third scan is an alternate horizontal scan; and the fourth scan is an alternate vertical scan.

With the above method, rearrangement of data is performed with high speed from the raster scan order in a row or column direction to the zigzag scan order, the alternate horizontal scan order or the alternate vertical scan order.

The tenth signal processing method of the present invention is based on any of the second, third and fifth signal processing methods, wherein: the first processing is encoding processing; and the second processing is processing for generating a reference image (restored image) which is necessary for interframe predictive coding in motion picture coding.

With the above method, encoding of data rearranged with high speed is started at an earlier timing, and the speed of encoding itself can be increased. Decoding of data rearranged with high speed is also started at an earlier timing, and the speed of decoding itself can be increased.

The first signal processing device of the present invention is a signal processing device for processing two-dimensional block data including a plurality of pieces of data, comprising: storage means including m memories for storing the block data, where m is an integer equal to or greater than 3; a plurality of input selectors for selecting data to be written in the m memories from n pieces of data which are consecutive in a write scan order, where n is an integer equal to or greater than 2, and n≠m; a plurality of output selectors for selecting n consecutive pieces of data in a read scan order from a plurality of pieces of data read from the m memories; and memory control means for controlling writing and reading of the block data in/from the storage means and supplying a selection signal to the plurality of input selectors and the plurality of output selectors.

With the above structure, there is provided a device for performing rearrangement of data with high speed from the write scan order to the read scan order selected among a plurality of scan orders.

The second signal processing device of the present invention is based on the first signal processing device, wherein each of the m memories included in the storage means has at least one write port and two or more read ports through which reading of data is possible independently of each other.

With the above structure, rearrangement of data from the write scan order to a plurality of scan orders is performed in parallel. Thus, there is provided a device for performing rearrangement of data with higher speed as compared with the first signal processing device.

The third signal processing device of the present invention is based on the first signal processing device and further comprises clock control means for separately controlling a clock supplied to the m memories.

With the above structure, supply of a clock to m memories is performed separately, and there is provided a high-speed signal processing device of low power consumption.

The fourth signal processing device of the present invention is based on the third signal processing device, wherein the clock control means operates such that: in the process of sorting n pieces of data which are consecutive in the first scan order into the m memories, a clock is supplied to a memory in which writing of data occurs, while no clock is supplied to a memory in which writing of data does not occur; and in order to select n consecutive pieces of data in the read scan order selected among the second scan, the third scan and the fourth scan, a clock is supplied to a memory in which a read cycle occurs, while no clock is supplied to a memory in which a read cycle does not occur.

With the above structure, supply of a clock is adaptively controlled such that a clock is supplied to a memory in which a memory access necessary for rearrangement of data occurs while no clock is supplied to a memory in which a memory access does not occur. Thus, the power consumption can be further reduced.

The fifth signal processing device of the present invention is a signal processing device for processing two-dimensional block data including a plurality of pieces of data, comprising: storage means including a memory for storing the block data, the memory having at least one write port and n read ports through which reading of data is possible independently of each other; a plurality of output selectors for selecting n consecutive pieces of data in a read scan order from a plurality of pieces of data read through the n read ports of the memory; and memory control means for controlling writing and reading of the block data such that the block data is written in the storage means in a write scan order, and the block data stored in the storage means is read in the read scan order, and supplying a selection signal to the plurality of output selectors.

With the above structure, the area occupied by a memory is reduced in the case where the technique of the present invention is realized in a semiconductor device, or the like, because the storage means is formed not by a plurality of memories but by a single memory. Thus, the cost can be reduced.

The first image capturing system of the present invention comprises: an image processing circuit including any of the first to fifth signal processing devices; a sensor for outputting an image signal to the image processing circuit; and an optical system for forming an image of light on the sensor.

With the above structure, the speed of image processing can be increased along with high speed data rearrangement.

The second image capturing system of the present invention is based on the first image capturing system and further comprises a converter for converting an image signal obtained from the sensor to a digital signal and supplying the digital signal to the image processing circuit.

With the above structure, the advantages of digital signal processing are achieved.

BRIEF DESCRIPTION OF THE DRAWINGS

FIGS. 3A, 3B, 3C and 3D show two-dimensional images of memory maps of a plurality of memories and the four scan orders according to embodiment 1 of the present invention.

FIGS. 4A, 4B and 4C show one-dimensional images of memory maps of a plurality of memories according to embodiment 1 of the present invention.

FIG. 5 illustrates write control for a plurality of memories in the case of raster scan according to embodiment 1 of the present invention.

FIG. 6 illustrates read control for a plurality of memories in the case of zigzag scan according to embodiment 1 of the present invention.

FIG. 7 illustrates read control for a plurality of memories in the case of alternate horizontal scan according to embodiment 1 of the present invention.

FIG. 8 illustrates read control for a plurality of memories in the case of alternate vertical scan according to embodiment 1 of the present invention.

FIGS. 14A and 14B respectively show a two-dimensional image and a one-dimensional image of memory maps of a memory according to embodiment 4 of the present invention.

FIG. 15 illustrates memory write control in the case of raster scan according to embodiment 4 of the present invention.

FIG. 16 illustrates memory read control in the case of zigzag scan according to embodiment 4 of the present invention.

FIG. 17 illustrates memory read control in the case of alternate horizontal scan according to embodiment 4 of the present invention.

FIG. 18 illustrates memory read control in the case of alternate vertical scan according to embodiment 4 of the present invention.

FIGS. 24A and 24B show two-dimensional images of memory maps of a plurality of memories and the two scan orders in the conventional signal processing device.

FIGS. 25A and 25B show one-dimensional images of memory maps of a plurality of memories in the conventional signal processing device.

FIGS. 26A and 26B illustrate write control and read control for a plurality of memories in the conventional signal processing device.

FIGS. 28A, 28B, 28C and 28D show examples which prove that the conventional signal processing method cannot achieve the objectives of the present invention.

DESCRIPTION OF THE PREFERRED EMBODIMENTS

Hereinafter, embodiments of the present invention will be described with reference to the drawings.

Embodiment 1

Figure 1:
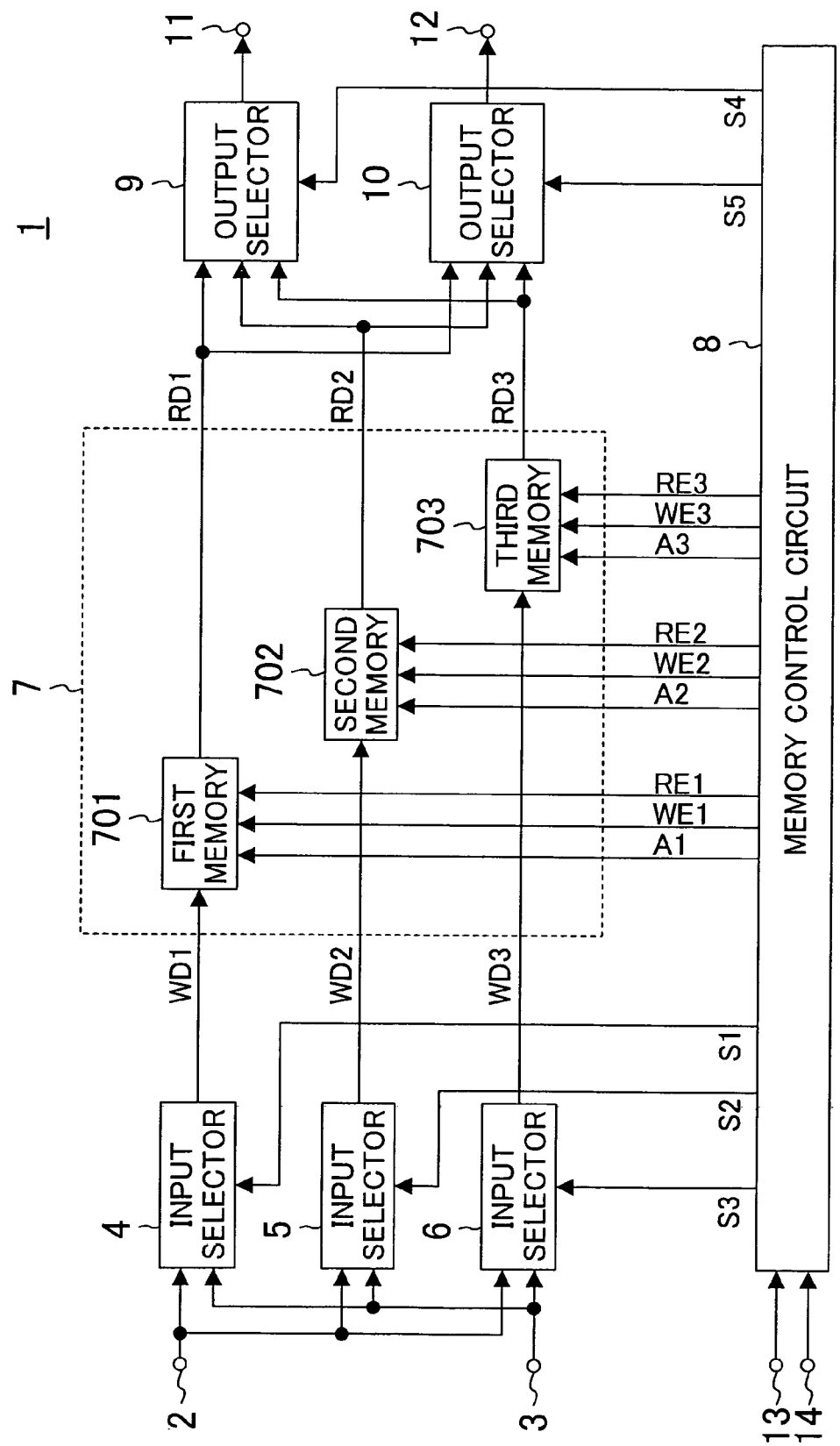
FIG. 1 shows a structure of a signal processing device according to embodiment 1 of the present invention.
Figure 2:
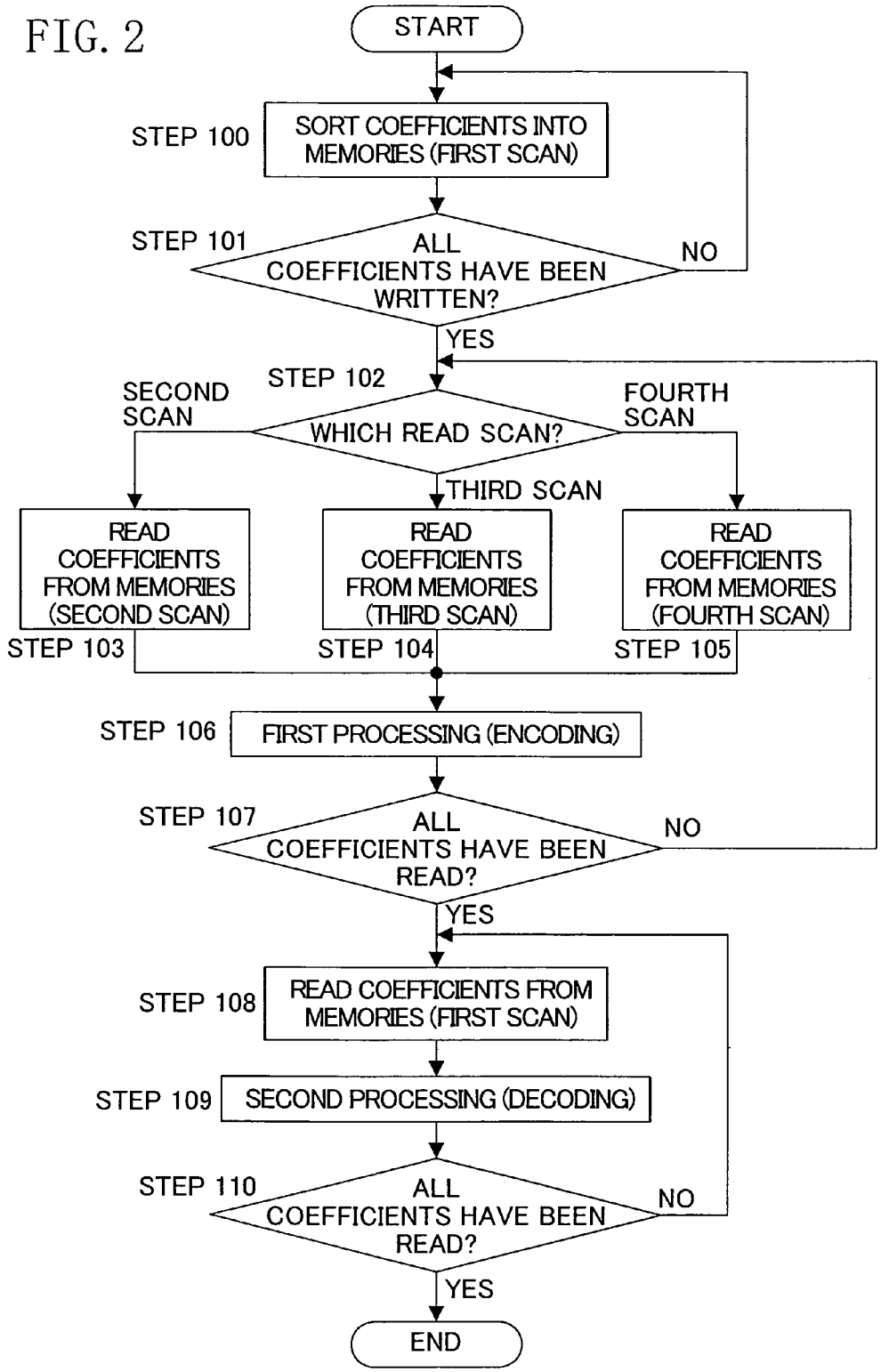
FIG. 2 is a flowchart illustrating a signal processing method according to embodiment 1 of the present invention.

FIG. 1 is a block diagram showing a structure of a signal processing device 1 according to embodiment 1 of the present invention. FIG. 2 is a flowchart illustrating a signal processing method of the present invention which uses the signal processing device 1 of FIG. 1.

Embodiment 1 is characterized in that a storage unit 7 is formed by m memories such that n consecutive pieces of data (coefficients) can be read in parallel in the read scan order (m is an integer equal to or greater than 3, and men). In the example described below, it is assumed that n=2 and m=3.

The signal processing device 1 of FIG. 1 includes input terminals 2 and 3, input selectors 4, 5 and 6, a storage unit 7, output selectors 9 and 10, output terminals 11 and 12, a prediction coefficient input terminal 13, a setting terminal 14, and a memory control circuit 8. Through the input terminals 2 and 3, n pieces of data which are consecutive in the write scan (first scan) order are input (herein, n=2). The input selectors 4, 5 and 6 sort the quantized DCT coefficients input through the input terminals 2 and 3 into m memories (herein, m=3). The storage unit 7 includes a first memory 701, a second memory 702 and a third memory 703 for temporarily storing the data. The output selectors 9 and 10 each select one of m pieces of data read from the storage unit 7 (herein, n=2). The n pieces of data selected by the output selectors 9 and 10 are output through the output terminals 11 and 12, respectively. DC coefficients (σA, σB and σC) of blocks (A, B and C) adjacent to a block to be coded, which are necessary for selecting the read scan mode, are input through the prediction coefficient input terminal 13. Mode switching between the DC predictive coding and the DC/AC predictive coding is set through the setting terminal 14. The memory control circuit 8 controls writing/reading of data in/from the storage unit 7 according to the coding mode set through the setting terminal 14. The memory control circuit 8 supplies selection signals S1, S2, S3, S4 and S5 to the selectors 4, 5, 6, 9 and 10, respectively.

Hereinafter, the signal processing method of embodiment 1 is described with reference to FIGS. 2 to 8.

Referring to FIG. 2, in the first place, two coefficients which are consecutive in the write scan (first scan) order are sorted into the first memory 701, the second memory 702 or the third memory 703 such that the two consecutive coefficients can be read in parallel in the selected read scan order no matter which scan mode is selected from among a plurality of read scan modes (first scan, second scan, third scan and fourth scan) (step 100). Then, it is determined whether or not writing of all of the coefficients of blocks necessary for coding has been completed (step 101). The coefficients of blocks necessary for coding mean, for example in MPEG-4, the coefficients for one macroblock including a plurality of blocks. Steps 100 and 101 are repeated till all of the coefficients have been written.

FIG. 3A shows an example where all of the coefficients are sorted into the first memory 701, the second memory 702 and the third memory 703 as described above. In FIG. 3A, a box of dense hatch lines corresponds to a region of the first memory 701, a box of rough hatch lines corresponds to a region of the second memory 702, and a box of no hatch line corresponds to a region of the third memory 703. Two coefficients which are consecutive in the write scan (first scan) order (0, 8, 16, 24, . . . , 55 and 63) are sorted into respective memory regions as shown in FIG. 3A. In the case of such sorting, the memory control circuit 8 supplies addresses A1, A2 and A3 shown in FIGS. 4A, 4B, and 4C to the first memory 701, the second memory 702 and the third memory 703, respectively. The memory control circuit 8 supplies control signals S1, S2 and S3 to the input selectors 4, 5 and 6, respectively, in order to control write data WD1, WD2 and WD3 written in the first memory 701, the second memory 702 and the third memory 703, respectively. The input selectors 4, 5 and 6 sequentially select write data WD1, WD2 and WD3 shown in FIGS. 4A to 4C based on selection signals S1, S2 and S3, respectively. The first memory 701, the second memory 702 and the third memory 703 write the coefficients in respective addresses of each memory according to write enable signals WE1, WD2 and WE3 supplied from the memory control circuit 8.

FIG. 5 illustrates addresses (A1, A2 and A3), write data (WD1, WD2 and WD3), and write enable signals (WE1, WE2 and WE3) of respective memories in the above-described write control. In FIG. 5, if the write enable signal (WE1, WE2, WE3) is 1, data is written in that address. If the write enable signal is 0, data is not written in the address.

After the two coefficients which are consecutive in the write scan (first scan) order have been written in the first memory 701, the second memory 702 and the third memory 703 as described above, the read scan mode is determined (step 102 of FIG. 2). The read scan mode is determined as described below using the coding mode (DC predictive coding or DC/AC predictive coding) set through the setting terminal 14 and the DC coefficient (σA, σB, σC) of an adjacent block (A, B, C) which is input through the prediction coefficient input terminal 13.

If the coding mode is set to DC predictive coding, it is determined that the read scan is zigzag scan (second scan). If the coding mode is set to DC/AC predictive coding, the gradients of the DC coefficients (σA, σB, σC) of adjacent blocks (A, B, C) are calculated. Then, prediction block P is determined from the calculated gradients. In the case where it is determined that block P is block C, if the coding efficiency can be improved as compared with DC predictive coding, it is determined that the read scan mode is alternate horizontal scan (third scan). If the coding efficiency cannot be improved, it is determined that the read scan mode is zigzag scan (second scan). In the case where it is determined that block P is block A, if the coding efficiency can be improved as compared with DC predictive coding, it is determined that the read scan mode is alternate vertical scan (fourth scan). If the coding efficiency cannot be improved, it is determined that the read scan mode is zigzag scan (second scan).

If zigzag scan (second scan) is selected as a result of the determination of the read scan, the coefficients are read from the first memory 701, the second memory 702 and the third memory 703 in the zigzag scan order such that two consecutive coefficients are read in parallel as shown in FIG. 3B (step 103). FIG. 6 illustrates read control in respective memories at step 103. In the case of zigzag scan, the order of reading coefficients is "0, 1, 8, 16, 9, 2, . . . , 47, 55, 62, 63". The memory control circuit 8 supplies read addresses A1, A2 and A3 and read enable signals RE1, RE2 and RE3 to the corresponding memories. The coefficients are appropriately read from the three memories 701 to 703. The output selectors 9 and 10 select two consecutive coefficients in the zigzag scan order, such that the coefficients are output in parallel through the output terminals 11 and 12 on a two-by-two basis.

Specifically, as for the two coefficients first output through the output terminals 11 and 12, (0, 1), coefficient 0 is read from the first memory 701 (RD1) while coefficient 1 is read from the second memory 702 (RD2) at the same time. The memory control circuit 8 supplies selection signals S4 and S5 to the output selectors 9 and 10, respectively, such that a former one (0) of the thus-read two coefficients in the zigzag scan order is output to the output terminal 11 while the other (latter) coefficient (1) is output to the output terminal 12.

As for the two coefficients subsequently output through the output terminals 11 and 12, (8, 16), coefficient 8 is read from the third memory 703 (RD3) while coefficient 16 is read from the second memory 702 (RD2) at the same time. The memory control circuit 8 supplies selection signals S4 and S5 to the output selectors 9 and 10, respectively, such that a former one (8) of the thus-read two coefficients in the zigzag scan order is output to the output terminal 11 while the other (latter) coefficient (16) is output to the output terminal 12. Subsequently, the coefficients are sequentially read in parallel in the same manner on a two-by-two basis to perform the first processing (coding) (step 106).

Figure 7:
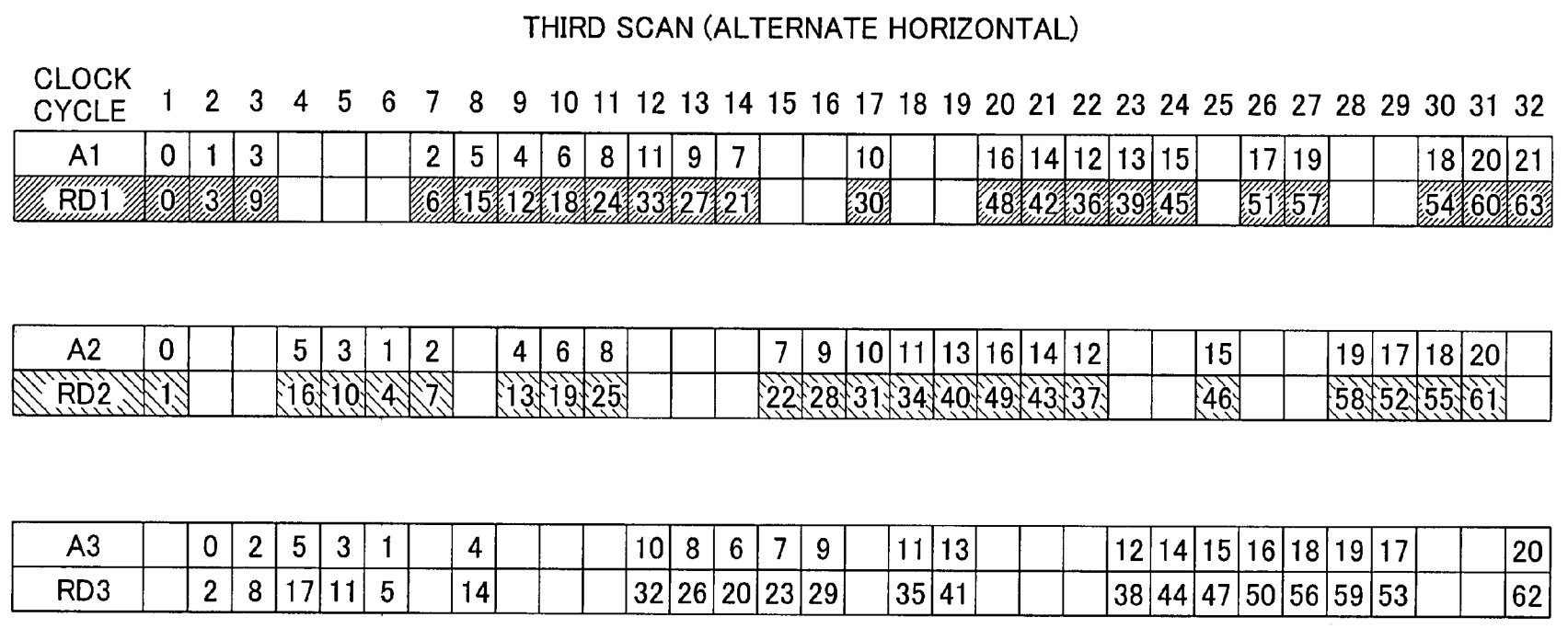

If alternate horizontal scan (third scan) is selected as a result of the determination of the read scan, the coefficients are read from the first memory 701, the second memory 702 and the third memory 703 in the alternate horizontal scan order such that two consecutive coefficients are read in parallel as shown in FIG. 3C (step 104). FIG. 7 illustrates read control in respective memories at step 104. Also in this example, coefficients are read in parallel on two-by-two basis to sequentially perform the first processing in the same manner as that described above in conjunction with the zigzag scan, and therefore, detailed description of this process is herein omitted.

If alternate vertical scan (fourth scan) is selected as a result of the determination of the read scan, the coefficients are read from the first memory 701, the second memory 702 and the third memory 703 in the alternate vertical scan order such that two consecutive coefficients are read in parallel as shown in FIG. 3D (step 105). FIG. 8 illustrates read control in respective memories at step 105. Also in this example, coefficients are read in parallel on two-by-two basis to sequentially perform the first processing in the same manner as that described above in conjunction with the zigzag scan, and therefore, detailed description of this process is herein omitted.

All of the coefficients are read as described above, and the processes from step 102 to step 106 are repeated till coding is completed (step 107). After all of the coefficients are read and the first processing is completed, the coefficients are read from the respective memories in the same scan order as the write scan (first scan) order (step 108), and the second processing (decoding) is sequentially performed to generate a reference image (step 109). The processes from step 108 to step 109 are repeated till generation of the reference image is completed (step 110). The reason why the second processing (decoding) is necessary is that since motion picture coding requires intraframe predictive coding, image data (reference data) of a previous frame is necessary, and a current block to be coded needs to be subjected to decoding (inverse quantization, inverse DCT, etc.) in advance.

As clearly seen from the above, so long as the storage unit 7 is formed by m memories (m is an integer equal to or greater than 3, and m>n) such that parallel writing and parallel reading of n pieces of data (n is an integer equal to or greater than 2) are achieved, the n pieces of data (coefficients) which are consecutive in the write scan order can be sorted into different memories such that the n consecutive pieces of data (coefficients) can be sequentially read in parallel in the read scan order no matter which scan mode is selected from among a plurality of read scan modes. As a result, change of the scan mode is quickly performed in the writing and reading processes, and therefore, quick coding is achieved. Furthermore, the feature of the present invention which realizes the above achievement resides in the memory structure in the storage unit 7, while the capacity of the memories is not increased at all.

Embodiment 2

A signal processing device 201 according to embodiment 2 of the present invention is described with reference to FIGS. 9 and 10.

Embodiment 2 is different from embodiment 1 in that m memories (herein, m=3) which constitute the storage unit 7 each have at least one write port (port A) and at least two read ports (port A and port B) with which reading is performed independently of each other, such that coefficients are read in parallel from the m memories through a plurality of read ports in different read scan orders, and the first processing (coding) and the second processing (decoding) can be simultaneously carried out.

Hereinafter, the differences from embodiment 1 are specifically described.

Figure 9:
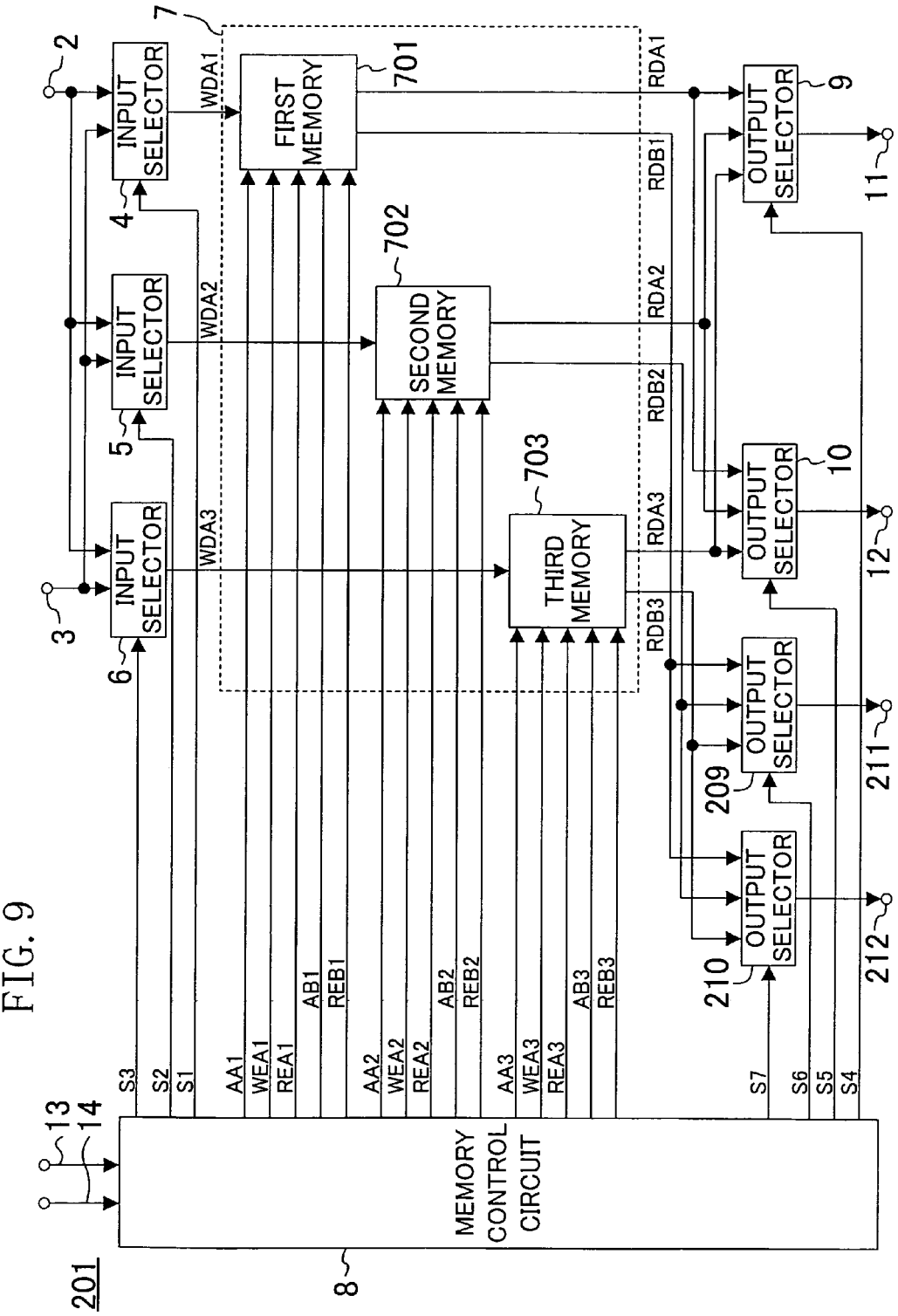
FIG. 9 shows a structure of a signal processing device according to embodiment 2 of the present invention.
Figure 10:
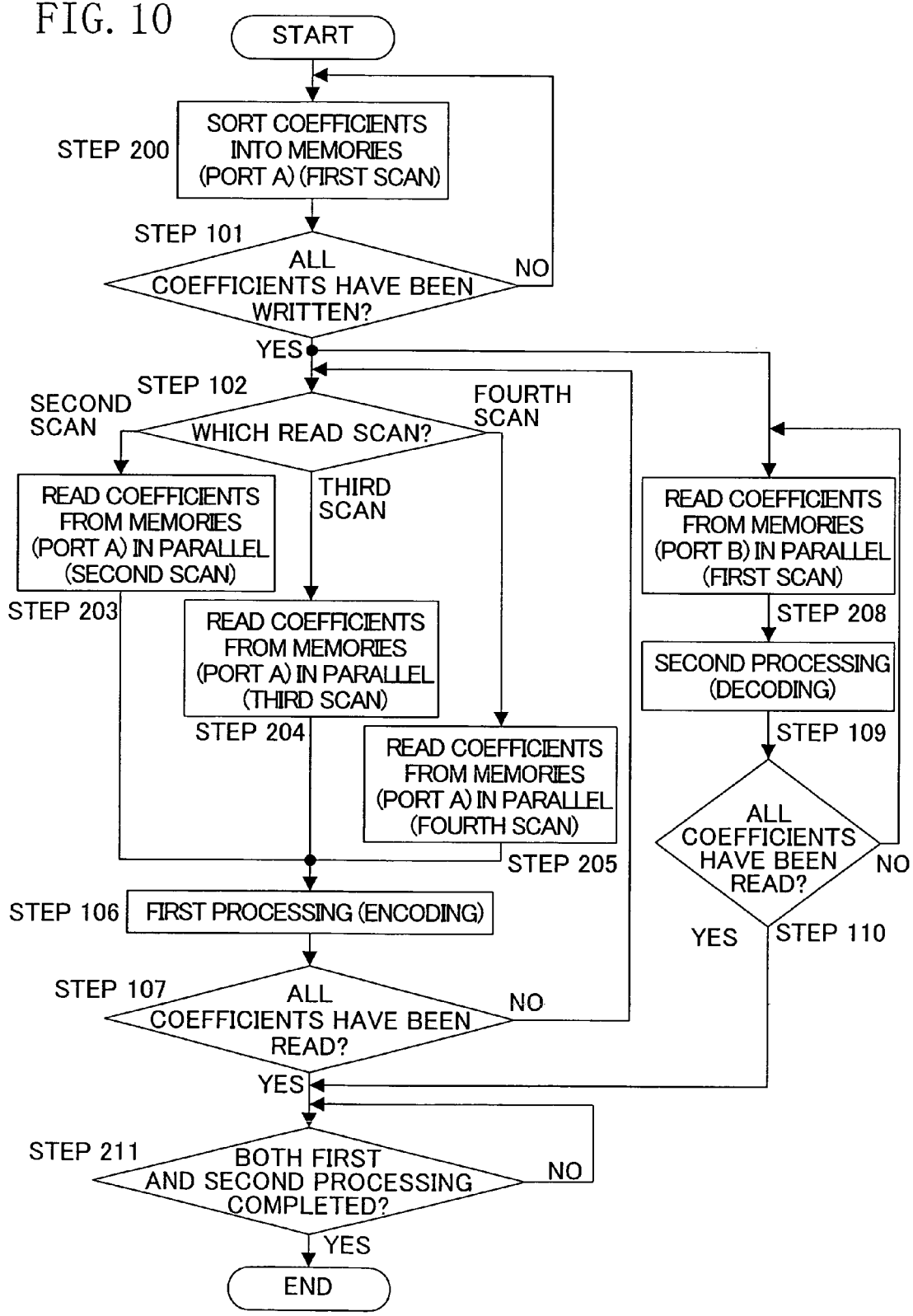
FIG. 10 is a flowchart illustrating a signal processing method according to embodiment 2 of the present invention.

In FIG. 9, each of the first memory 701, the second memory 702 and the third memory 703 has port A through which writing and reading can be carried out independently and read-only port B. Port A and port B are capable of reading data independently of each other. A coding method implemented with the storage unit 7 formed by m memories from which data can be read through a plurality of ports in parallel independently of each other as described above is described below as to the differences from embodiment 1 with reference to the flowchart shown in FIG. 10.

In the first place, as in embodiment 1, two coefficients which are consecutive in the write scan (first scan) order are sorted into the first memory 701, the second memory 702 or the third memory 703 such that the two consecutive coefficients can be read in parallel in the selected read scan order no matter which scan mode is selected from among a plurality of read scan modes (first scan, second scan, third scan and fourth scan). A difference from embodiment 1 resides in that port A which is a write/read dual port is selected among a plurality of ports (herein 2 ports) for carrying out writing of data (step 200).

In embodiment 1, the first processing (step 102 to step 107) is performed after all of the coefficients are written in the memories at step 101, and then, the second processing (step 108 to step 110) is performed. However, in embodiment 2, reading of data is simultaneously carried out using different read scan orders with port A and port B which are capable of reading operations independently of each other, such that the first processing (coding) and the second processing (decoding) are carried out in parallel.

Reading of coefficients necessary for the first processing (step 203, step 204 and step 205) is carried out using port A, while reading of coefficients necessary for the second processing (step 208) is carried out using port B, so that these processing can be carried out in parallel independently of each other. Thus, coding of motion picture is achieved with higher speed (i.e., within a shorter period of time) as compared with embodiment 1. Since port A and port B are employed for reading data in parallel, data read through port B (RDB1, RDB2, RDB3) are input to output selectors 209 and 210, n consecutive coefficients are selected in the read scan order based on selection signals S6 and S7 supplied from the memory control circuit 8 and output through output terminals 211 and 212 for carrying out the second processing.

Embodiment 3

Figure 11:
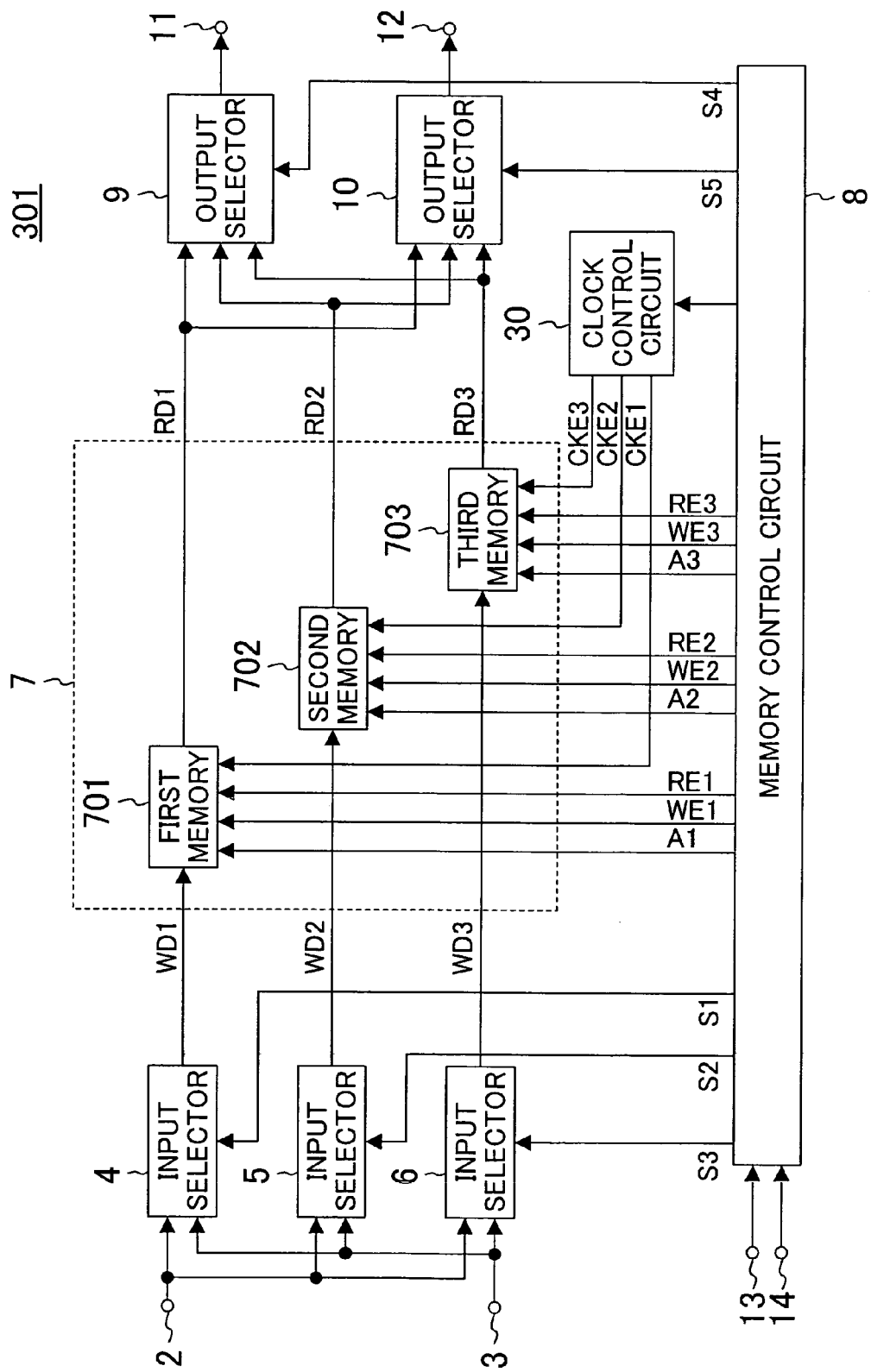
FIG. 11 shows a structure of a signal processing device according to embodiment 3 of the present invention.

FIG. 11 is a block diagram showing a structure of a signal processing device 301 according to embodiment 3 of the present invention. A major difference from embodiments 1 and 2 resides in that the signal processing device 301 further includes a clock control circuit 30 for controlling a clock of m memories (herein, m=3) which constitute the storage unit 7.

In embodiments 1 and 2, in the case of writing and reading control in m memories, not all of the memories need to operate in all of clock cycles as shown in FIGS. 5 to 8. In view of write control, as shown in FIG. 5, when n coefficients (herein, n=2) are written in m memories (m>n) in parallel, there is a memory in which data does not need to be written. In such a case, the clock control circuit 30 operates such that the clock of a memory in which data does not need to be written is stopped. For example, in a cycle where coefficient 0 (WD1=0) and coefficient 8 (WD3=8) are written in, the memory control circuit 8 operates such that coefficient 0 is written in the first memory 701 and coefficient 8 is written in the third memory 703, and therefore, a write cycle does not occur as for the second memory 702. Thus, the clock control circuit 30 supplies clock stop signal CKE2 to the second memory 702 to stop the clock.

Also in the first memory 701 and the third memory 703, during a cycle where writing does not occur, the clock control circuit 30 supplies clock stop signals CKE1 and CKE3, and the first memory 701 and the third memory 703 stop the clocks based on clock stop signals CKE1 and CKE3.

In embodiment 3, as described above, a clock is supplied to each memory only in a cycle where writing or reading occurs. Thus, a signal processing device with lower power consumption is achieved.

Although FIG. 11 shows a structure including the clock control circuit 30 added to the components of FIG. 1, the clock control circuit 30 may be added to the components of FIG. 9.

Embodiment 4

Figure 12:
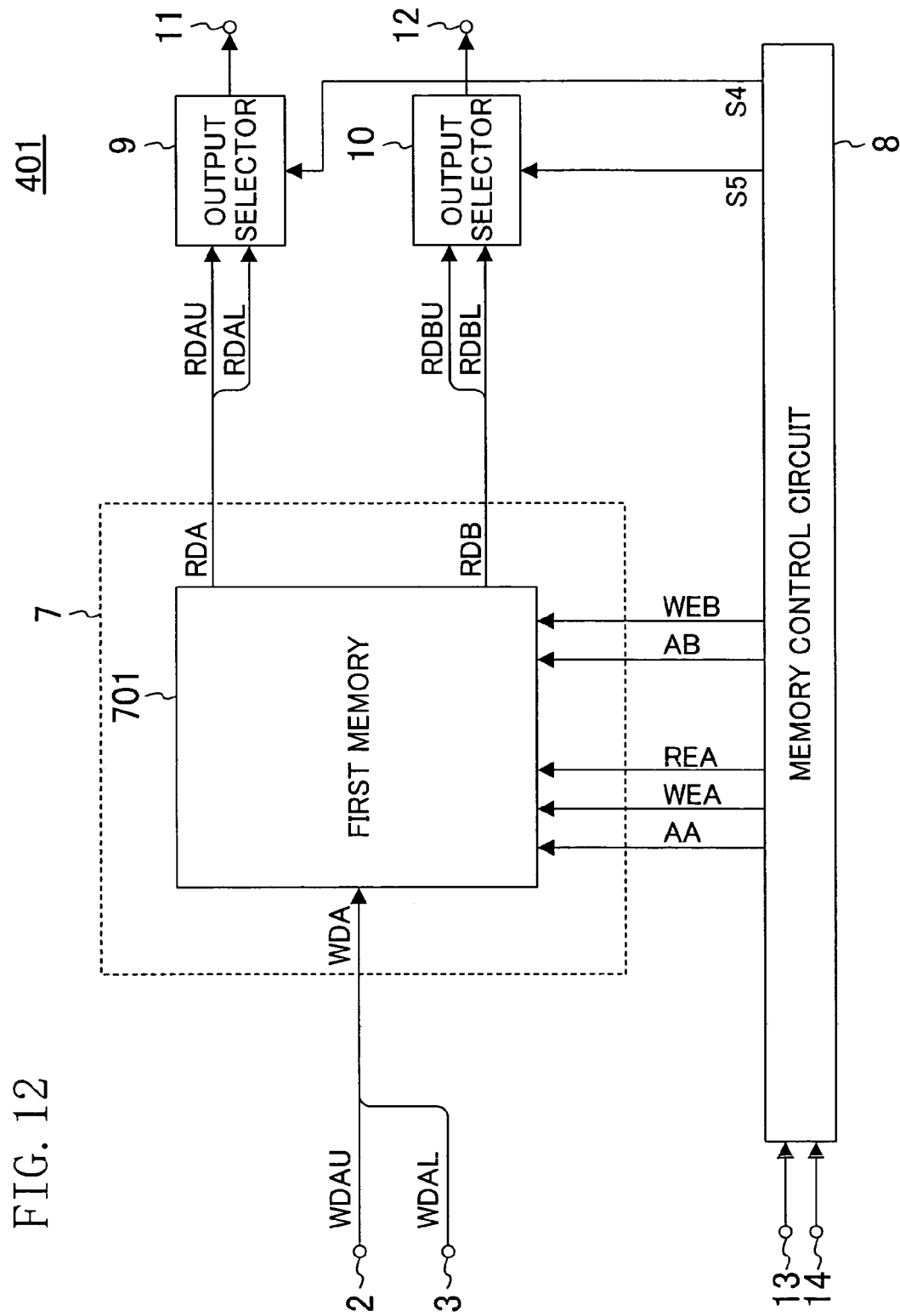
FIG. 12 shows a structure of a signal processing device according to embodiment 4 of the present invention.

FIG. 12 is a block diagram showing a structure of a signal processing device 401 according to embodiment 4 of the present invention. A major difference from embodiment 1 resides in that the storage unit 7 is formed by a signal memory (first memory 701) not by a plurality of memories (m memories). Further, although m memories in embodiment 1 each have one port for reading, the first memory 701 of embodiment 4 has at least one port for writing and at least two ports for reading with which reading is possible independently of each other.

Figure 13:
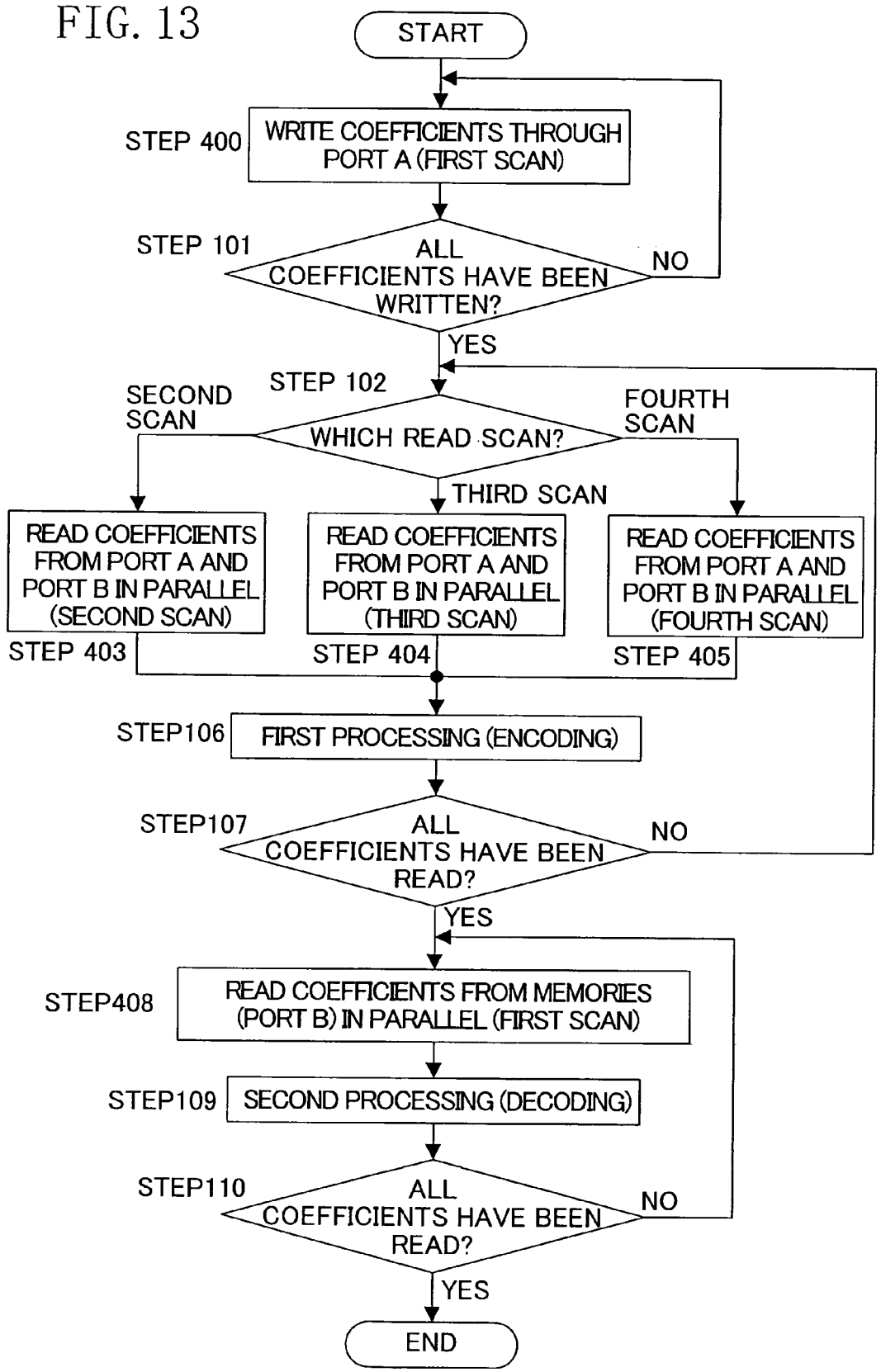
FIG. 13 is a flowchart illustrating a signal processing method according to embodiment 4 of the present invention.

Hereinafter, an operation of the signal processing device 401 where n=2 is specifically described with reference to the flowchart of FIG. 13.

Write Control Method

In FIG. 12, n pieces of data (herein, n=2) input through the input terminals 2 and 3, which are consecutive in the first scan order, WDAU and WDAL, are paired into data WDA. Data WDA is sequentially written in one address of the first memory 701 through port A. Write control in the first memory 701 at port A is carried out using write address AA and write enable signal WEA supplied from the memory control circuit 8 (step 400). Step 400 is repeated till all of the data of a block are written in the first memory 701 (step 101). FIGS. 14A and 14B show an example where all of the data are written in the first memory 701 as described above. FIG. 14A shows a two-dimensional image of a memory map of the first memory 701 wherein n pieces of data (herein, n=2) are temporarily stored in one address. FIG. 14B shows write address AA and write data WDA (WDAU and WADAL) in the first memory 701. Transition of write address AA and write data WDAU and WADAL which occurs in this example is shown in FIG. 15. As shown in FIG. 15, the write control is performed to sequentially store data such that, for example, two pieces of data, 0 and 8, which are consecutive in the write scan (first scan) order, are written in address 0, and subsequent data 16 and 24 are written in address 8.

Read Control Method

The read scan mode is determined using the determination method described in embodiment 1 (step 102). Once the read scan mode is determined, n consecutive pieces of data are read in the read scan (second scan, third scan or fourth scan) order through port A and port B. Specifically, among two pieces of data which are consecutive in the read scan order, a former one of the two data pieces is output through port A while the other (latter) one is read through port B in parallel. This reading operation is shown in FIGS. 16 to 18. FIG. 16 shows read address AA and read data RDA at port A and address AB and read data RDB at port B for the case where the read scan mode is zigzag scan. FIG. 17 shows read address AA and read data RDA at port A and address AB and read data RDB at port B for the case where the read scan mode is alternate horizontal scan. FIG. 18 shows read address AA and read data RDA at port A for the case where the read scan mode is alternate vertical scan.

Now, the read control is specifically described with an example wherein the read scan mode is zigzag scan (FIG. 16). In order to read pieces of data in the zigzag scan order in a parallel fashion on an n-pieces by n-pieces basis (herein, n=2), it is necessary to read the data in the order of (0, 1), (8, 16), (9, 2), (3, 10), . . . , (62, 63). For the purpose of performing such a reading operation, read address AA, 0, 0, 1, 3, . . . , 30, which is necessary for reading a former one of the two data pieces (0, 8, 9, 3, . . . , 62) from port A, is supplied from the memory control circuit 8. Data stored in address AA are read on a two-by-two basis in the order of (0, 8), (0, 8), (1, 9), (3, 11), . . . , (54, 62). Among the data read in such a manner on a two-by-two basis, a former one of the two data pieces (0, 8, 9, 3, . . . , 62) is selected to be output through the output terminal 11. Specifically, the memory control circuit 8 supplies selection signal S4 to the first output selector 9, and the first output selector 9 sequentially selects the former data in the read scan order based on selection signal S4 and outputs the selected data through the output terminal 11. In parallel to reading from port A, read address AB, 1, 8, 2, 2, . . . , 31, which is necessary for reading the other one (latter one) of the two pieces of data (1, 16, 2, 10, . . . , 63) from port B, is supplied from the memory control circuit 8, whereby data stored in address AB are read on a two-by-two basis in the order of (1, 9), (16, 24), (2, 10), (2, 10), . . . , (55, 63). Among the data read in such a manner on a two-by-two basis, a latter one of the two data pieces (1, 16, 2, 10, . . . , 63) is selected to be output through the output terminal 12. Specifically, the memory control circuit 8 supplies selection signal S5 to the second output selector 10, and the second output selector 10 sequentially selects the latter data in the read scan order based on selection signal S5 and outputs the selected data through the output terminal 12. The operation described hereinabove is the parallel reading operation (second scan) at step 403. The other part of the operation control is the same as that of embodiment 1, and therefore, detailed description thereof is herein omitted.

Writing and reading control is performed as described above, whereby n pieces of data can be read in parallel even in the case where the storage unit 7 is formed by a single memory. Accordingly, change of the scan mode can be realized with high speed. Further, it is not necessary to construct the storage unit 7 by a plurality of memories (m memories) as in embodiments 1, 2 and 3. Thus, in the case where the present invention is realized in the form of a semiconductor device, the area occupied by the memory in the semiconductor device is decreased, and the price thereof is accordingly decreased.

Embodiment 5

Figure 19:
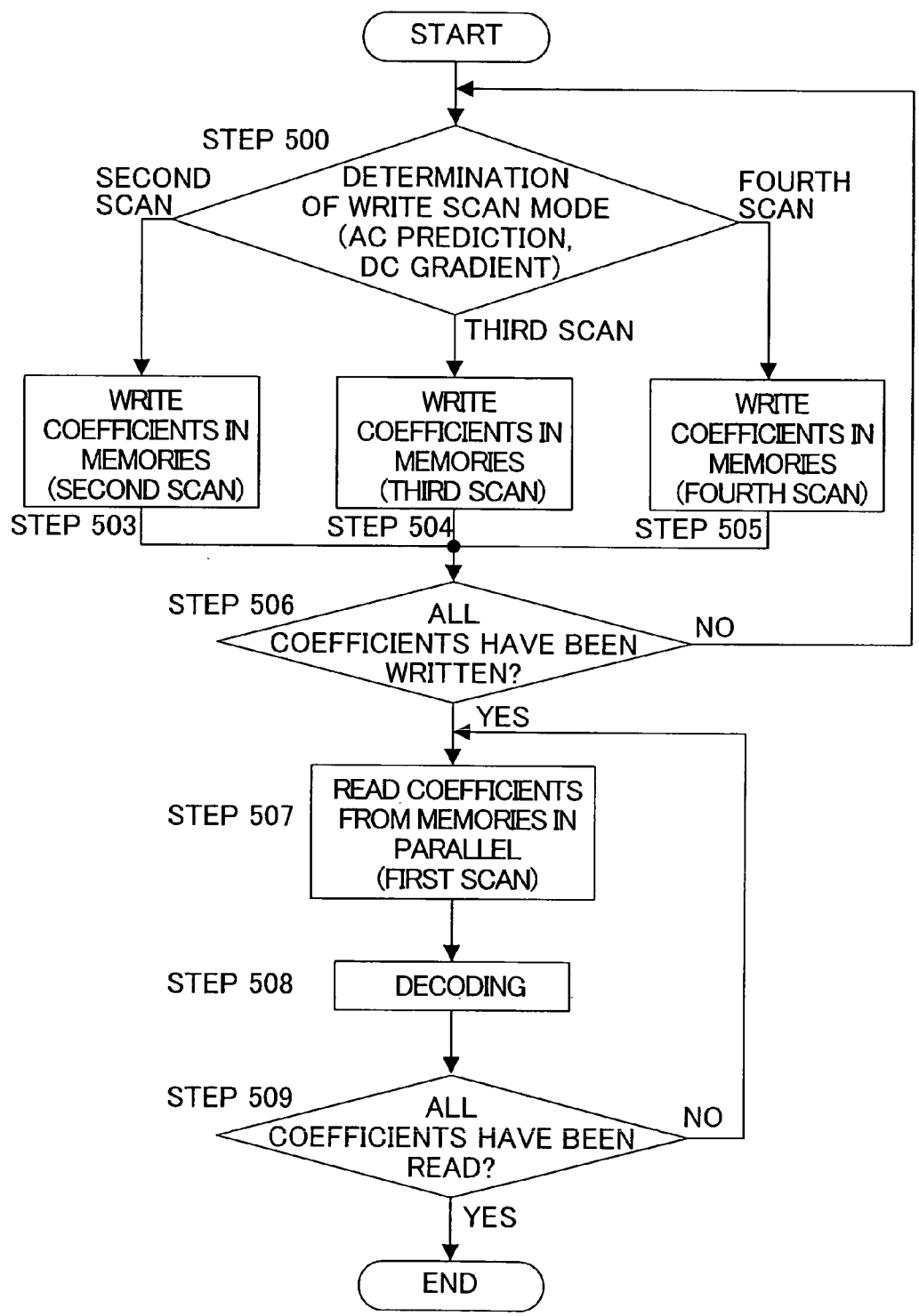
FIG. 19 is a flowchart illustrating a signal processing method according to embodiment 5 of the present invention.

FIG. 19 is a flowchart illustrating a signal processing method according to embodiment 5 of the present invention. Herein, the signal processing method of embodiment 5 is implemented using the signal processing device of embodiment 1 (FIG. 1).

Embodiment 5 intends to change the scan mode with high speed in the process of decoding motion pictures using the signal processing device 1, which is specifically described with reference to FIG. 19.

In the case of coding, writing of data in the first memory 701, the second memory 702 and the third memory 703 is performed while the read scan mode is fixed to the first scan, and the read scan mode is set to any one of the first scan, second scan, third scan and fourth scan. In the case of decoding (embodiment 5), the write scan mode is set to any one of the second scan, third scan and fourth scan, and the read scan mode is fixed to the first scan.

<Write Control Method>

DC coefficients (σA, σB, σC) of blocks (A, B, C) adjacent to a block to be decoded, which are necessary for selecting the write scan mode, are input through the prediction coefficient input terminal 13. Setting of the mode switch between DC predictive coding and DC/AC predictive coding is input through the setting terminal 14. The write scan mode (second scan, third scan, or fourth scan) is determined (step 500). The determination method is the same as that described in embodiment 1.

Then, n consecutive pieces of data (herein, n=3) are written in the write scan order in the m memories 701, 702 and 703 (herein, m=3) according to the write scan mode determined at step 500 (step 503 to step 505). The writing operation is repeated till all of the data are written in the memories (step 506). In the write control, the write addresses and write data supplied to the respective memories are the same as those shown in FIGS. 6 to 8.

<Read Control Method>

If it is determined at step 506 that writing of all data is completed, n consecutive coefficients are sequentially read in the first scan order from m memories 701, 702 and 703. The n consecutive coefficients are selected in the first scan order by the output selectors 9 and 10, whereby the n consecutive coefficients are sequentially output through the output terminals 11 and 12 (step 507). In the read control, the addresses and read data supplied to the respective memories are the same as those shown in FIG. 5.

The series of n pieces of data which have been sequentially read in the first scan order are sequentially subjected to decoding process (step 508), and this process is repeated till reading and decoding of all data are completed (step 509).

With the above-described signal processing method, rearrangement of data (change of scan mode) in the motion picture decoding process is also performed with high speed as in the coding process.

Embodiment 6

Figure 20:
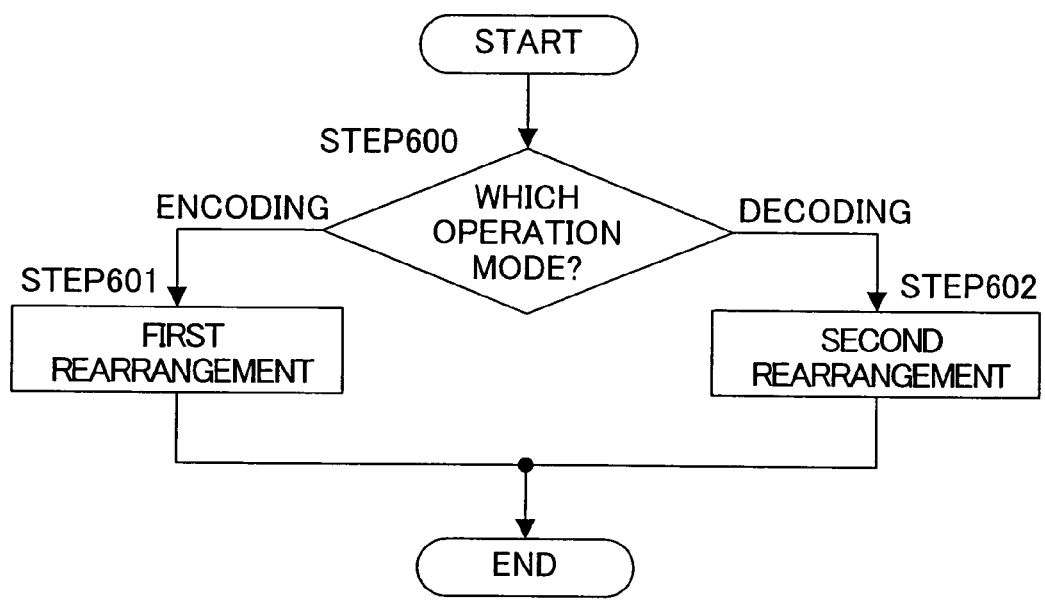
FIG. 20 is a flowchart illustrating a signal processing method according to embodiment 6 of the present invention.

FIG. 20 is a flowchart illustrating a signal processing method according to embodiment 6 of the present invention. Embodiment 6 intends to realize rearrangement of data with lower cost and higher speed by using the signal processing device 1 of embodiment 1 for both encoding and decoding.

In the first place, the set operation mode is determined (step 600). In the case where the operation mode is encoding, the processes of step 100 to step 110 of FIG. 2 are performed at step 601, whereby data rearrangement is performed with high speed. In the case where the operation mode is decoding, the processes of step 500 to step 509 of FIG. 19 are performed at step 602, whereby data rearrangement is performed with high speed.

As described above, high speed data rearrangement in the encoding process and high speed data rearrangement in the decoding process are realized with lower cost and high speed by exclusively using a single signal processing device.

Embodiment 7

Figure 21:
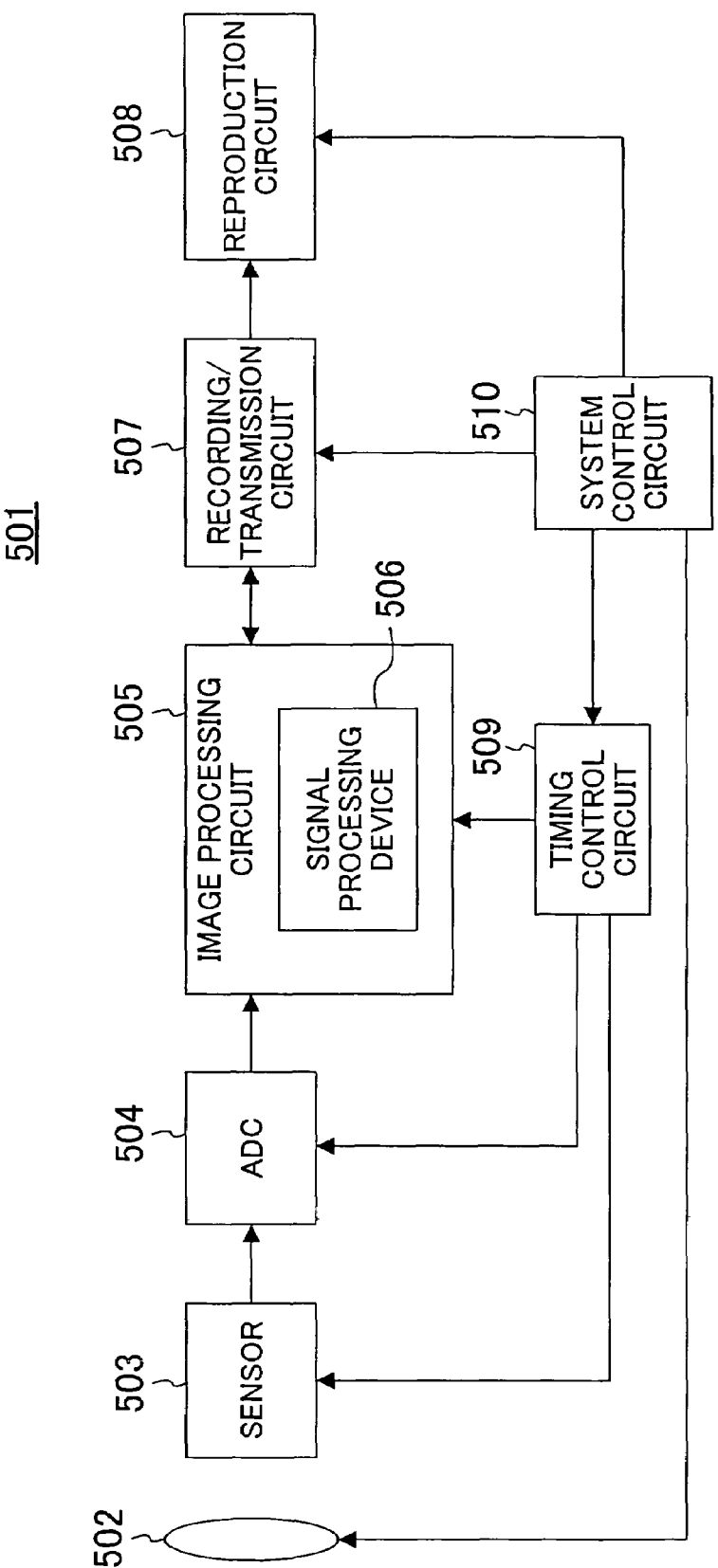
FIG. 21 shows a structure of an image capturing system according to embodiment 7 of the present invention.
Figure 22:
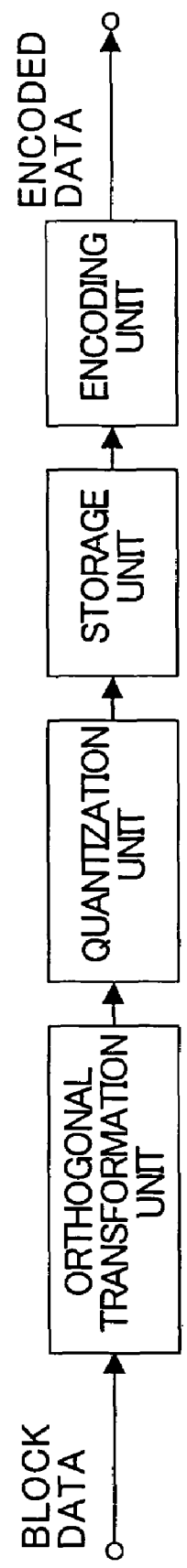
FIG. 22 shows a structure of a conventional commonly-employed image coding device.
Figure 23:
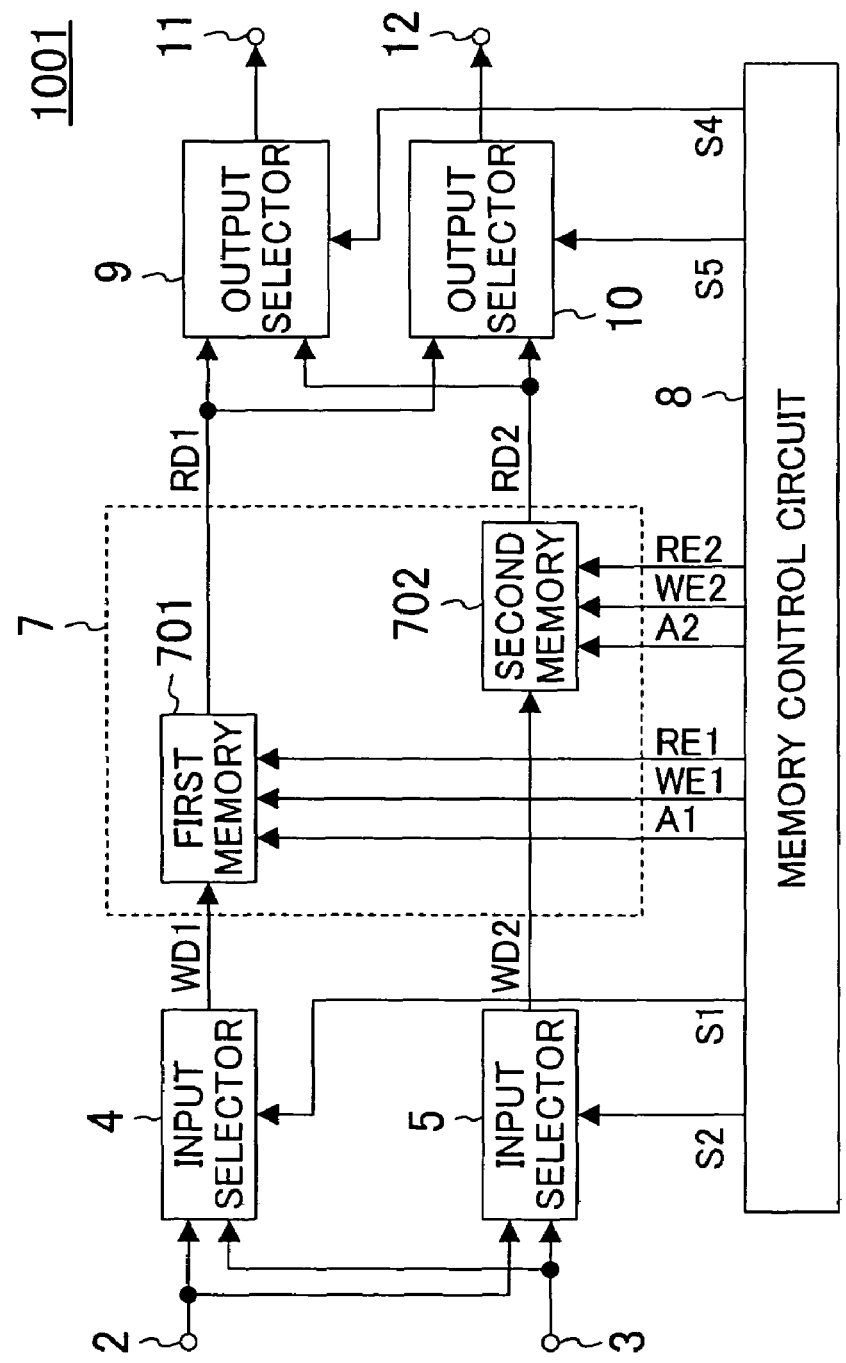
FIG. 23 shows a structure of a conventional signal processing device.
Figure 27:
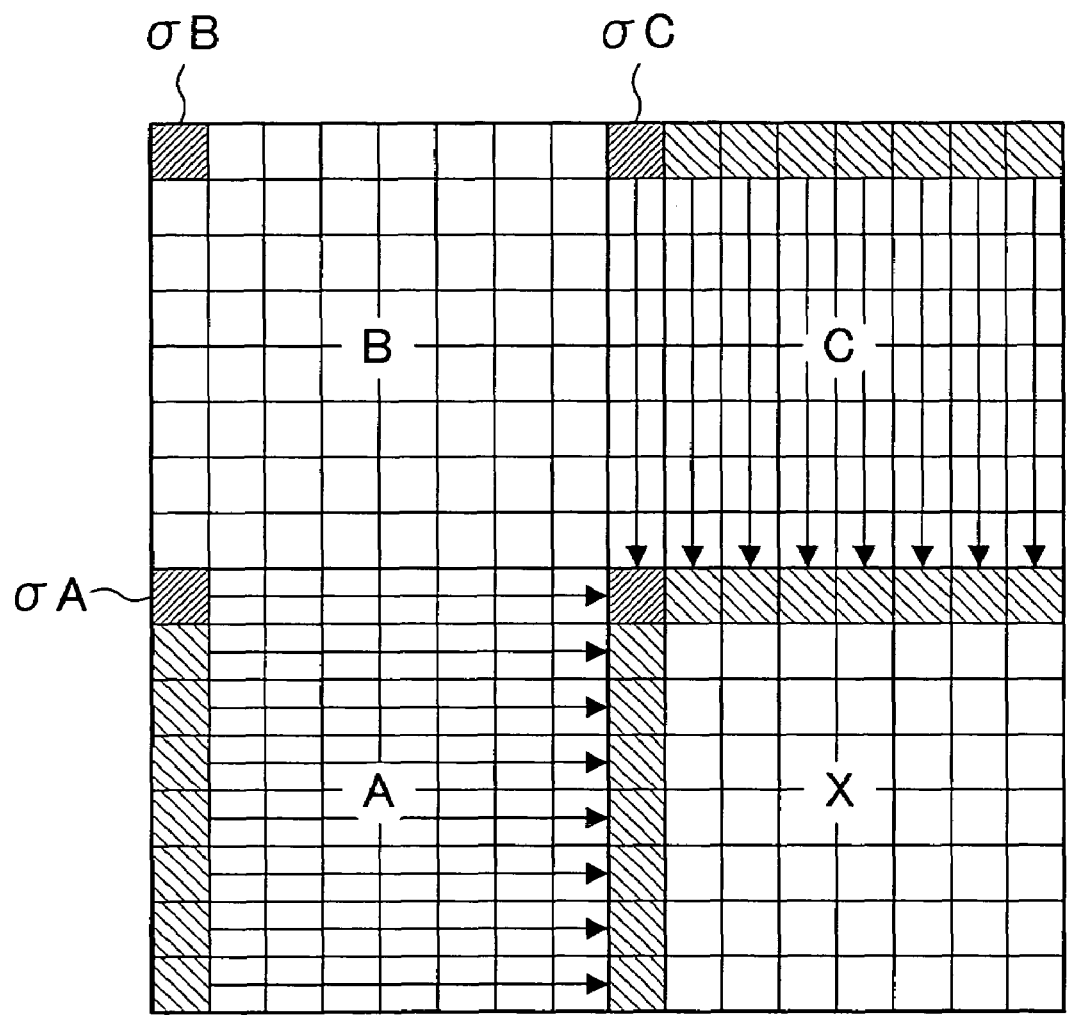
FIG. 27 illustrates a conventional coefficient prediction method.

FIG. 21 is a block diagram showing a structure of an image capturing system 501 (e.g., a digital still camera (DSC)) according to embodiment 7 of the present invention. A signal processing device 506 of FIG. 21 is any of the signal processing devices of embodiments 1-6 of the present invention.

In the structure of FIG. 21, light of an image passes through an optical system 502, and the image is formed on a sensor 503. The sensor 503 is driven by a timing control circuit 509 to accumulate the light of the image formed on the sensor 503 and photoelectrically convert it to an electric signal. The electric signal read from the sensor 503 is converted to a digital signal by an analog to digital converter (ADC) 504. The digital signal is input to an image processing circuit 505 which includes the signal processing device 506. In the image processing circuit 505, image processing, such as Y/C processing, edge processing, image expansion/contraction, image compression/decompression processing based on the present invention, etc., are performed. The image-processed signal is recorded on a medium or transmitted to a reproduction circuit 508 by a recording/transmission circuit 507. The recorded or transmitted signal is reproduced by the reproduction circuit 508. The entire image capturing system 501 is controlled by a system control circuit 510.

As a matter of course, the image processing in the signal processing device 506 can be performed not only on a signal generated based on light of an image formed on the sensor 503 after passing through the optical system 502 but also on an image signal input in the form of an electric signal from an external device, for example.

The signal processing methods and signal processing devices of the present invention readily achieve high speed data rearrangement (change of scan mode) even when a plurality of write scan modes and a plurality of read scan modes are employed. Thus, the methods and devices of the present invention are applicable to an image encoding/decoding system in which high speed encoding and decoding with lower cost are required.

The present invention is especially useful to portable devices using MPEG-4, which has been receiving attention as a low bit rate coding technique in recent years, such as camera phones, PDAs, etc. Furthermore, the present invention is also useful to DSCs, for which high-quality, long-time motion picture recording at low bit rate has been increasingly demanded, and AV devices used in association with such portable devices.

What is claimed is:

1. A method of image compression comprising the steps of:
   dividing a two-dimensional image into a plurality of blocks;
   generating block data including a plurality of pieces of data by calculating a DCT coefficient for each block;
   storing the block data by sequentially sorting sets of n pieces of data which are consecutive in a first scan order, into m memories, where n is an integer equal to or greater than 2, m is an integer equal to or greater than 3, and m≠n; and
   performing rearrangement of data by reading a plurality of pieces of data from the m memories and sequentially selecting sets of n consecutive pieces of data in a read scan order selected among a second scan order, a third scan order, and a fourth scan order.

2. The method of image compression according to claim 1, further comprising the steps of:
   performing a first processing on the selected n pieces of data; and
   after completion of the first processing, sequentially selecting n consecutive pieces of data in the first scan order from the plurality of data read from the m memories and performing a second processing on the selected n pieces of data.

3. The method of image compression according to claim 1, wherein:
   each of the m memories comprises a write port and a plurality of read ports through which reading of data is possible independently of each other; and
   the method further includes the steps of
      performing reading of data through one of the read ports of each of the m memories for rearrangement of the data to perform the first processing on n consecutive pieces of data in the read scan order selected among the second scan, the third scan and the fourth scan, and
      sequentially selecting n consecutive pieces of data in the first scan order among a plurality of pieces of data read from another read port of each of the m memories in parallel to the first processing to perform the second processing on the selected n pieces of data.

4. A method of image compression comprising the steps of:
   dividing a two-dimensional image into a plurality of blocks;
   generating block data including a plurality of pieces of data by calculating a DCT coefficient for each block;
   storing the block data in a memory having at least one write port and n read ports through which reading of data is possible independently of each other by sequentially writing sets of n consecutive pieces of data in the first scan order from the write port to the memory, where n is an integer equal to or greater than 2; and
   performing rearrangement of data by reading a plurality of pieces of data through the n read ports of the memory and sequentially selecting sets of n consecutive pieces of data in a read scan order selected among a second scan order, a third scan order, and a fourth scan order.

5. The method of image compression according to claim 4, further comprising the steps of:
   performing the first processing on the selected n pieces of data; and
   after completion of the first processing, sequentially selecting n consecutive pieces of data in the first scan order from the plurality of data read through the n read ports of the memory and performing the second processing on the selected n pieces of data.

6. A method of image compression comprising the steps of:
   dividing a two-dimensional image into a plurality of blocks;
   generating block data including a plurality of pieces of data by calculating a DCT coefficient for each block;
   storing the block data by sequentially sorting sets of n consecutive pieces of data into m memories in the write scan order selected among a second scan order, a third scan order, and a fourth scan order, where n is an integer equal to or greater than 2, m is an integer equal to or greater than 3, and m≠n; and performing rearrangement of data by reading a plurality of pieces of data from the m memories and sequentially selecting sets of n consecutive pieces of data in a first scan order.

7. The method of image compression according to claim 6, further comprising the step of decoding the selected n pieces of data.

8. A method of image compression wherein rearrangement of data is performed according to a set operation mode such that:

in the first operation mode, rearrangement of data is performed using a first signal processing method recited in any one of claims 1-3; and in the second operation mode, rearrangement of data is performed using a second signal processing method, wherein the first signal processing method comprises the steps of:

storing the block data by sequentially sorting n pieces of data which are consecutive in a first scan order into m memories, where n is an integer equal to or greater than 2, m is an integer equal to or greater than 3, and m≠n; and performing rearrangement of data by reading a plurality of pieces of data from the m memories and sequentially selecting n consecutive pieces of data in a read scan order selected among a second scan order, a third scan order, and a fourth scan order, and the second signal processing method comprises the steps of:

storing the block data by sequentially sorting n consecutive pieces of data into m memories in a write scan order selected among the second scan order, the third scan order, and the fourth scan order, where n is an integer equal to or greater than 2, m is an integer equal to or greater than 3, and m≠n; and performing rearrangement of data by reading a plurality of pieces of data from the m memories and sequentially selecting n consecutive pieces of data in the first scan order.

9. The method of image compression according to any one of claims 1, 4 and 6, wherein:

the first scan order is a raster scan in a row direction or column direction;

the second scan order is a zigzag scan;

the third scan order is an alternate horizontal scan; and the fourth scan order is an alternate vertical scan.

10. The method of image compression according to any one of claims 2, 3 and 5, wherein:

the first processing is encoding processing; and the second processing is processing for generating a reference image which is necessary for interframe predictive coding in motion picture coding.

11. A signal processing device for processing two-dimensional block data including a plurality of pieces of data, comprising:

m memories for storing the block data, where m is an integer equal to or greater than 3;

a plurality of input selectors for selecting data to be written in the m memories from sets of n pieces of data which are supplied consecutively in a write scan order, where n is an integer equal to or greater than 2, and n≠m;

a plurality of output selectors for selecting sets of n consecutive pieces of data in a read scan order from a plurality of pieces of data read from the m memories; and a memory control circuit which provides a selection signal to each of the plurality of input selectors and the plurality of output selectors.

12. The signal processing device according to claim 11, wherein each of the m memories has at least one write port and two or more read ports through which reading of data is possible independently of each other.

13. The signal processing device according to claim 11, further comprising a clock control circuit which provides and controls a respective clock signal to each of the m memories.

14. The signal processing device according to claim 13, wherein the clock control circuit operates such that:

in the process of sorting n pieces of data which are consecutive in the first scan order into the m memories, a clock is supplied to a memory in which writing of data occurs, while no clock is supplied to a memory in which writing of data does not occur; and in order to select n consecutive pieces of data in the read scan order selected among the second scan order, the third scan order, and the fourth scan order, a clock is supplied to a memory in which a read cycle occurs, while no clock is supplied to a memory in which a read cycle does not occur.

15. A signal processing device for processing two-dimensional block data including a plurality of pieces of data, comprising:

a memory for storing the block data, the memory having at least one write port and n read ports through which reading of data is possible independently of each other;

a plurality of output selectors for selecting sets of n consecutive pieces of data in a read scan order from a plurality of pieces of data read through the n read ports of the memory; and a memory control circuit which provides a selection signal to each of the plurality of output selectors, such that the block data is written in the storage means in a write scan order, and the block data stored in the storage means is read in the read scan order.

16. An image capturing system, comprising:

an image processing circuit including a signal processing device for processing two-dimensional block data including a plurality of pieces of data;

a sensor for outputting an image signal to the image processing circuit; and an optical system for forming an image of light on the sensor, the signal processing device including:

m memories for storing the block data, where m is an integer equal to or greater than 3;

a plurality of input selectors for selecting data to be written in the m memories from sets of n pieces of data which are consecutive in a write scan order, where n is an integer equal to or greater than 2, and n≠m;

a plurality of output selectors for selecting sets of n consecutive pieces of data in a read scan order from a plurality of pieces of data read from the m memories; and memory control circuit which provides a selection signal to each of the plurality of input selectors and the plurality of output selectors.

17. The image capturing system according to claim 16, further comprising a converter which receives the image signal obtained from the sensor, converts the image signal to a digital signal, and provides the digital signal to the image processing circuit.

18. An image capturing system, comprising:

an image processing circuit including a signal processing device for processing two-dimensional block data including a plurality of pieces of data;

a sensor for outputting an image signal to the image processing circuit;

an optical system for forming an image of light on the sensor, the signal processing device including:

a memory for storing the block data, the memory having at least one write port and n read ports through which reading of data is possible independently of each other;

a plurality of output selectors for selecting n consecutive pieces of data in a read scan order from a plurality of pieces of data read through the n read ports of the memory; and a memory control circuit which provides a selection signal to each of the plurality of output selectors, such that the block data is written in the storage means in a write scan order, and the block data stored in the storage means is read in the read scan order.

* * * * *